US012399809B2

(12) United States Patent
Kushnir et al.

(10) Patent No.: US 12,399,809 B2
(45) Date of Patent: Aug. 26, 2025

(54) GRAPHIC USER INTERFACE HEATMAP OF MOST USED SYSTEM TRANSACTION WITH TEST AUTOMATION DETAILS

(71) Applicant: UiPath, Inc., New York, NY (US)

(72) Inventors: Lev Kushnir, Vienna (AT); Amol Awate, Karnatake (IN); Rick Chalkley, Richmond, VA (US); Gerd Weishaar, Schwyz (CH); Gurpreet Chahal, Karnataka (IN); Sumit Chourasia, Karnataka (IN)

(73) Assignee: UiPath, Inc., New York, NY (US)

( * ) Notice: Subject to any disclaimer, the term of this patent is extended or adjusted under 35 U.S.C. 154(b) by 133 days.

(21) Appl. No.: 18/330,230

(22) Filed: Jun. 6, 2023

(65) Prior Publication Data

US 2024/0362157 A1 Oct. 31, 2024

(30) Foreign Application Priority Data

Apr. 25, 2023 (IN) .............................. 202311029856

(51) Int. Cl.
G06F 11/34 (2006.01)
G06F 11/3668 (2025.01)
G06Q 10/10 (2023.01)

(52) U.S. Cl.
CPC ...... *G06F 11/3688* (2013.01); *G06F 11/3692* (2013.01); *G06Q 10/103* (2013.01); *G06F 11/3452* (2013.01); *G06F 11/3495* (2013.01)

(58) Field of Classification Search
CPC ............ G06F 11/3688; G06F 11/3692; G06F 11/3452; G06F 11/3495; G06Q 10/103
See application file for complete search history.

(56) References Cited

U.S. PATENT DOCUMENTS

| 9,098,412 B1* | 8/2015 | Marchant | G06F 11/321 |
| 11,003,572 B2* | 5/2021 | Naylor-Teece | G06F 11/3684 |
| 11,436,006 B2 | 9/2022 | Gass et al. | |
| 11,520,947 B1* | 12/2022 | Serackis | G06F 9/451 |

(Continued)

FOREIGN PATENT DOCUMENTS

AU 2020102300 A4 10/2020

OTHER PUBLICATIONS

Adjusting your Websites to Fit all Types of Resolution Using HTML and CSS by Goonathilake published Apr. 24, 2014 https://www.codeproject.com/Articles/762201/Adjusting-your-Websites-to-Fit-all-Types-of-Resolu (Year: 2014).*

(Continued)

*Primary Examiner* — Joseph O Schell
(74) *Attorney, Agent, or Firm* — Volpe Koenig

(57) ABSTRACT

A method for transformation and visualization of consolidated data is provided. The method is executed by a determination engine implemented as a computer program within a computing environment. The method includes executing a data consolidation that normalizes aggregated data into the consolidated data by subjecting the aggregated data to transformations per weights to output the consolidated data. The method includes executing a data transformation and visualization by determining final ratings for the consolidated data and generating on a display a user interface comprising a heatmap depicting the consolidated data according to the final ratings.

20 Claims, 14 Drawing Sheets

(56) References Cited

U.S. PATENT DOCUMENTS

| | | | |
|---|---|---|---|
| 11,972,272 B2* | 4/2024 | Berg | G06F 9/451 |
| 2012/0084224 A1* | 4/2012 | Bhandar | G06Q 10/06 |
| | | | 705/342 |
| 2013/0307843 A1 | 11/2013 | Vishal et al. | |
| 2017/0132649 A1* | 5/2017 | Oliva | G06Q 20/3224 |
| 2017/0153799 A1* | 6/2017 | Hoyer | G06Q 10/0631 |
| 2019/0243641 A1* | 8/2019 | Gass | G06F 8/425 |
| 2022/0035730 A1 | 2/2022 | Srinivasetet et al. | |

OTHER PUBLICATIONS

Sap Hana Troubleshooting and Performance Analysis Guide Document Version: 1.0—Jul. 17, 2020 https://sapbasisprep.wordpress.com/wp-content/uploads/2020/09/sap_hana_troubleshooting_and_performance_analysis_guide_en.pdf (Year: 2020).*

Matejka, et al. "Patina: Dynamic Heatmaps for Visualizing Application Usage" Apr. 27, 2013.

Singh "Interactive Visual Analysis of Anomalous Accounts Payable Transactions in SAP Enterprise Systems" Feb. 2, 2016.

\* cited by examiner

GRAPHIC USER INTERFACE HEATMAP OF MOST USED SYSTEM TRANSACTION WITH TEST AUTOMATION DETAILS

CROSS REFERENCE TO RELATED APPLICATIONS

This application claims priority to Indian patent application No. 202311029856, filed Apr. 25, 2023, which is incorporated by reference as if fully set forth.

FIELD

This disclosure generally relates to automation, and more specifically, to a graphic user interface heatmap of most used system transaction with test automation details.

BACKGROUND

Companies utilize conventional software packages (e.g., SAP systems) for day-to-day business. Conventional software packages can be comprehensive and enable thousands of transactions (e.g., SAP transactions, SAP Fiori Applications, SAP Webdynpro, SAP WinGUI, SAP WebGUI, or the like) in a single software instance of the conventional software packages. Thus, given the sheer volume of transactions, companies have difficulty understanding a usage of the conventional software packages (i.e., compiling and processing usage data). Moreover, as conventional software packages receive updates, companies need to execute tests with respect to any change in each single software instance, for all test cases.

Conventional collection programs can run every minute to accumulate the usage data of the conventional software packages. Yet, conventional collection programs generally do not extract analytics or can even manage the accumulated usage data. At best, conventional collection programs provide giga bytes of data that is not normalized and is tedious and time consuming to analyze by only the most specialized conventional programs.

For example, a ST03(N) is an SAP standard transaction that is used for monitoring system performance and analyzing system workload. However, using the ST03(N) for analytics can be difficult and complex for a number of reasons. For instance, to use the ST03(N), end users are required to have expert technical knowledge and understanding of an architecture of the SAP system, database concepts, and performance metrics. Without an expert technical knowledge and understanding, interpreting information provided by ST03(N) is extremely difficult. Further, an amount of data generated by ST03(N) can be vast, such as more than 10 GB of technical data. Analyzing such an amount of data is time-consuming. And, with such an amount of data, the end user is burdened with cumbersome and difficult to comprehend information. Furthermore, the data can be extended across different locations, thereby being overwhelming difficult to navigate. Also, very little technical documentation regarding how to use ST03(N) exists, let alone documentation on the many application server, work process, transaction, and user layers.

Thus, a solution is needed to acquire usage data and derive analytics out of the usage data.

SUMMARY

According to one or more embodiments, a method for transformation and visualization of consolidated data is provided. The method is executed by a determination engine implemented as a computer program within a computing environment. The method includes executing a data consolidation that normalizes aggregated data into the consolidated data by subjecting the aggregated data to transformations per weights to output the consolidated data. The method includes executing a data transformation and visualization by determining final ratings for the consolidated data and generating on a display a user interface comprising a heatmap depicting the consolidated data according to the final ratings.

BRIEF DESCRIPTION OF THE DRAWINGS

In order that the advantages of certain embodiments herein will be readily understood, a more particular description will be rendered by reference to specific embodiments that are illustrated in the appended drawings. While it should be understood that these drawings depict only typical embodiments and are not therefore to be considered to be limiting of its scope, the one or more embodiments herein will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Embodiments herein pertain to automation. More specifically, embodiments herein pertain to automatically generating a graphic user interface heatmap of most used system transaction with test automation details. The graphic user interface heatmap can be automatically generated by one or more computing systems executing an determination engine that further executes robotic process automations (RPA). According to one or more embodiments, the determination engine, generally, performs operations or methods that acquire usage data of a software system and derive analytics out of the usage data. The operations or methods of the determination engine include utilizing the derived analytics to generate the graphic user interface heatmap as a consolidation, aggregation, and visualization of a software system usage. The determination engine can enable the graphic user interface heatmap to depict the most used transaction in the software system along with test automation details. For example, the determination engine can provide, via the graphic user interface heatmap, instant discovery of test automation opportunities for the software system. According to one or more embodiments, the determination engine can also aggregate the usage data extracted by a collection program and calculating and/or transform the usage data respective to weights, and visualize the usage data as the graphic user interface heatmap. Further, the determination engine can enable the graphic user interface heatmap to depict indications of test relevancy and test prioritization.

Figure 1:
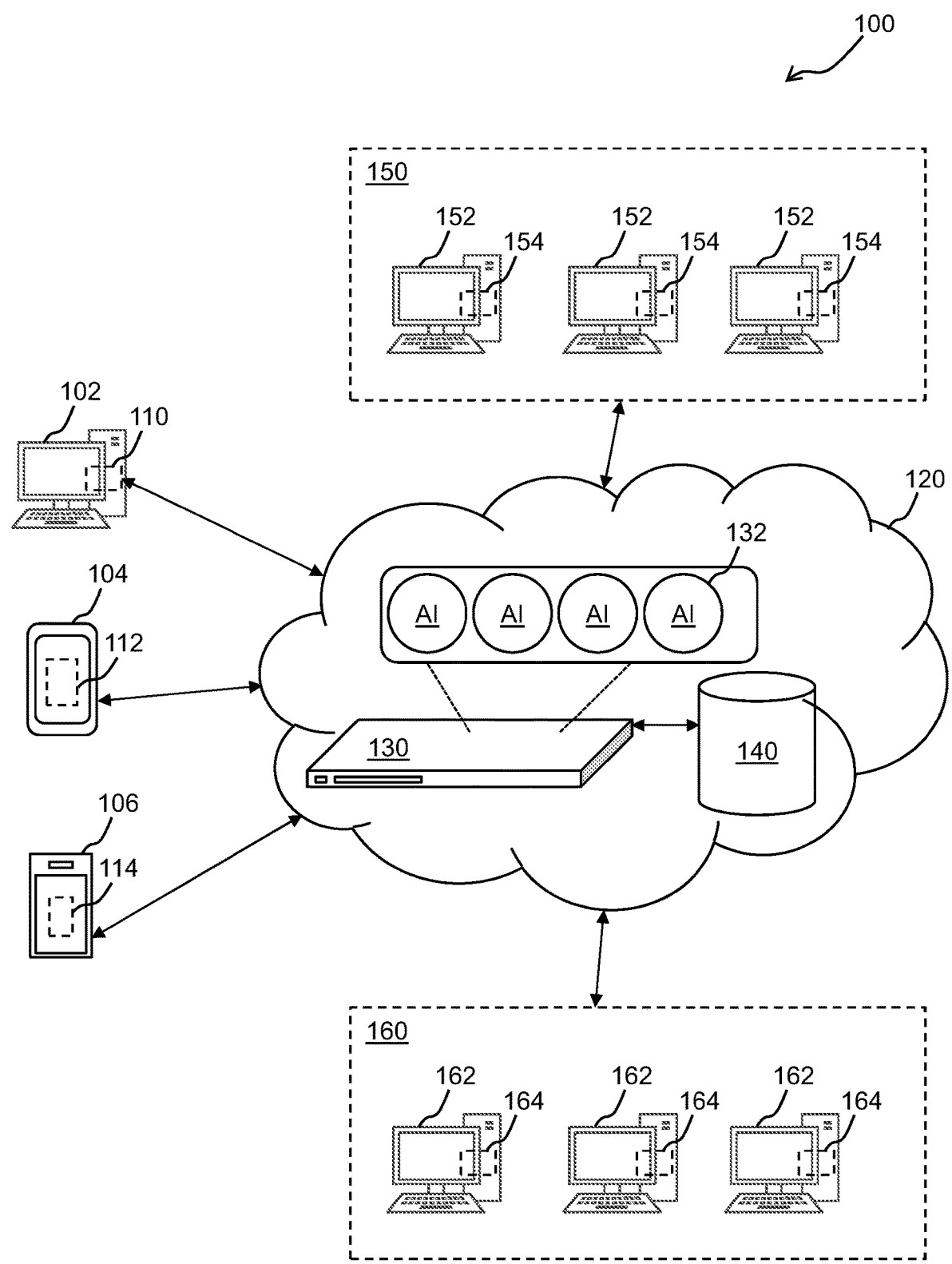
FIG. 1 depicts an architectural diagram illustrating an automation system according to one or more embodiments.

FIG. 1 is an architectural diagram illustrating a hyper-automation system 100, according to one or more embodiments. "Hyper-automation," as used herein, refers to automation systems that bring together components of process automation, integration tools, and technologies that amplify the ability to automate work. For instance, RPA may be used at the core of a hyper-automation system in some embodiments, and in certain embodiments, automation capabilities may be expanded with artificial intelligence and/or machine (AI/ML), process mining, analytics, and/or other advanced tools. As the hyper-automation system learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

Hyper-automation system 100 includes user computing systems, such as desktop computer 102, tablet 104, and smart phone 106. However, any desired computing system may be used without deviating from the scope of one or more embodiments herein including, but not limited to, smart watches, laptop computers, servers, Internet-of-Things (IoT) devices, etc. Also, while three user computing systems are shown in FIG. 1, any suitable number of computing systems may be used without deviating from the scope of the one or more embodiments herein. For instance, in some embodiments, dozens, hundreds, thousands, or millions of computing systems may be used. The user computing systems may be actively used by a user or run automatically without much or any user input.

Each computing system 102, 104, 106 has respective automation process(es) 110, 112, 114 running thereon. Automation process(es) 102, 104, 106 may include, but are not limited to, RPA robots, part of an operating system, downloadable application(s) for the respective computing system, any other suitable software and/or hardware, or any combination of these without deviating from the scope of the one or more embodiments herein. In some embodiments, one or more of process(es) 110, 112, 114 may be listeners. Listeners may be RPA robots, part of an operating system, a downloadable application for the respective computing system, or any other software and/or hardware without deviating from the scope of the one or more embodiments herein. Indeed, in some embodiments, the logic of the listener(s) is implemented partially or completely via physical hardware.

Listeners monitor and record data pertaining to user interactions with respective computing systems and/or operations of unattended computing systems and send the data to a core hyper-automation system 120 via a network (e.g., a local area network (LAN), a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from the listeners may be sent periodically as part of a heartbeat message. In some embodiments, the data may be sent to core hyper-automation system 120 once a predetermined amount of data has been collected, after a predetermined time period has elapsed, or both. One or more servers, such as server 130, receive and store data from the listeners in a database, such as database 140.

Automation processes may execute the logic developed in workflows during design time. In the case of RPA, workflows may include a set of steps, defined herein as "activities," that are executed in a sequence or some other logical flow. Each activity may include an action, such as clicking a button, reading a file, writing to a log panel, etc. In some embodiments, workflows may be nested or embedded.

Long-running workflows for RPA in some embodiments are master projects that support service orchestration, human intervention, and long-running transactions in unattended environments. See U.S. Pat. No. 10,860,905, which is incorporated by reference for all it contains. Human intervention comes into play when certain processes require human inputs to handle exceptions, approvals, or validation before proceeding to the next step in the activity. In this situation, the process execution is suspended, freeing up the RPA robots until the human task completes.

A long-running workflow may support workflow fragmentation via persistence activities and may be combined with invoke process and non-user interaction activities, orchestrating human tasks with RPA robot tasks. In some embodiments, multiple or many computing systems may participate in executing the logic of a long-running workflow. The long-running workflow may run in a session to facilitate speedy execution. In some embodiments, long-running workflows may orchestrate background processes that may contain activities performing Application Programming Interface (API) calls and running in the long-running workflow session. These activities may be invoked by an invoke process activity in some embodiments. A process with user interaction activities that runs in a user session may be called by starting a job from a conductor activity (conductor described in more detail later herein). The user may interact through tasks that require forms to be completed in the conductor in some embodiments. Activities may be included that cause the RPA robot to wait for a form task to be completed and then resume the long-running workflow.

One or more of automation process(es) 110, 112, 114 is in communication with core hyper-automation system 120. In some embodiments, core hyper-automation system 120 may run a conductor application on one or more servers, such as server 130. While one server 130 is shown for illustration purposes, multiple or many servers that are proximate to one another or in a distributed architecture may be employed without deviating from the scope of the one or more embodiments herein. For instance, one or more servers may be provided for conductor functionality, AI/ML model serving, authentication, governance, and/or any other suitable functionality without deviating from the scope of the one or more embodiments herein. In some embodiments, core hyper-automation system 120 may incorporate or be part of a public cloud architecture, a private cloud architecture, a hybrid cloud architecture, etc. In certain embodiments, core hyper-automation system 120 may host multiple software-based servers on one or more computing systems, such as server 130. In some embodiments, one or more servers of core hyper-automation system 120, such as server 130, may be implemented via one or more virtual machines (VMs).

In some embodiments, one or more of automation process (es) 110, 112, 114 may call one or more AI/ML models 132 deployed on or accessible by core hyper-automation system 120. AI/ML models 132 may be trained for any suitable purpose without deviating from the scope of the one or more embodiments herein, as will be discussed in more detail herein. Two or more of AI/ML models 132 may be chained in some embodiments (e.g., in series, in parallel, or a combination thereof) such that they collectively provide collaborative output(s). AI/ML models 132 may perform or assist with computer vision (CV), optical character recognition (OCR), document processing and/or understanding, semantic learning and/or analysis, analytical predictions, process discovery, task mining, testing, automatic RPA workflow generation, sequence extraction, clustering detection, audio-to-text translation, any combination thereof, etc. However, any desired number and/or type(s) of AI/ML models may be used without deviating from the scope of the one or more embodiments herein. Using multiple AI/ML models may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models are deployed locally on at least one of computing systems 102, 104, 106.

In some embodiments, multiple AI/ML models 132 may be used. Each AI/ML model 132 is an algorithm (or model) that runs on the data, and the AI/ML model itself may be a deep learning neural network (DLNN) of trained artificial "neurons" that are trained in training data, for example. In some embodiments, AI/ML models 132 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to perform the desired functionality.

Hyper-automation system 100 may provide four main groups of functionality in some embodiments: (1) discovery; (2) building automations; (3) management; and (4) engagement. Automations (e.g., run on a user computing system, a server, etc.) may be run by software robots, such as RPA robots, in some embodiments. For instance, attended robots, unattended robots, and/or test robots may be used. Attended robots work with users to assist them with tasks (e.g., via UiPath Assistant™). Unattended robots work independently of users and may run in the background, potentially without user knowledge. Test robots are unattended robots that run test cases against applications or RPA workflows. Test robots may be run on multiple computing systems in parallel in some embodiments.

The discovery functionality may discover and provide automatic recommendations for different opportunities of automations of business processes. Such functionality may be implemented by one or more servers, such as server 130. The discovery functionality may include providing an automation hub, process mining, task mining, and/or task capture in some embodiments. The automation hub (e.g., UiPath Automation Hub™) may provide a mechanism for managing automation rollout with visibility and control. Automation ideas may be crowdsourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from user computing systems 102, 104, 106 by listeners, for example, and processed by servers, such as server 130. One or more AI/ML models 132 may be employed for this purpose in some embodiments. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/ML models 132 may be employed to uncover recurring task patterns in the data. Repetitive tasks that are ripe for automation may then be identified. This information may initially be provided by listeners and analyzed on servers of core hyper-automation system 120, such as server 130, in some embodiments. The findings from task mining (e.g., extensive application markup language (XAML) process data) may be exported to process documents or to a designer application such as UiPath Studio™ to create and deploy automations more rapidly.

Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to a designer application in some embodiments, such as UiPath Studio™. Task capture may simplify the requirements gathering process for both subject matter experts explaining a process and Center of Excellence (CoE) members providing production-grade automations.

Building automations may be accomplished via a designer application (e.g., UiPath Studio™, UiPath StudioX™, or UiPath Web™). For instance, RPA developers of an PA development facility 150 may use RPA designer applications 154 of computing systems 152 to build and test automations for various applications and environments, such as web, mobile, SAP®, and virtualized desktops. API integration may be provided for various applications, technologies, and platforms. Predefined activities, drag-and-drop modeling, and a workflow recorder, may make automation easier with minimal coding. Document understanding functionality may be provided via drag-and-drop AI skills for data extraction and interpretation that call one or more AI/ML models 132. Such automations may process virtually any document type and format, including tables, checkboxes, signatures, and handwriting. When data is validated or exceptions are handled, this information may be used to retrain the respective AI/ML models, improving their accuracy over time.

An integration service may allow developers to seamlessly combine user interface (UI) automation with API automation, for example. Automations may be built that require APIs or traverse both API and non-API applications and systems. A repository (e.g., UiPath Object Repository™) or marketplace (e.g., UiPath Marketplace™) for pre-built RPA and AI templates and solutions may be provided to allow developers to automate a wide variety of processes more quickly. Thus, when building automations, hyper-automation system 100 may provide user interfaces, development environments, API integration, pre-built and/or custom-built AI/ML models, development templates, integrated development environments (IDEs), and advanced AI capabilities. Hyper-automation system 100 enables development, deployment, management, configuration, monitoring, debugging, and maintenance of RPA robots in some embodiments, which may provide automations for hyper-automation system 100.

In some embodiments, components of hyper-automation system 100, such as designer application(s) and/or an external rules engine, provide support for managing and enforcing governance policies for controlling various functionality provided by hyper-automation system 100. Governance is the ability for organizations to put policies in place to prevent users from developing automations (e.g., RPA robots) capable of taking actions that may harm the organization, such as violating the E.U. General Data Protection Regulation (GDPR), the U.S. Health Insurance Portability and Accountability Act (HIPAA), third party application terms of service, etc. Since developers may otherwise create automations that violate privacy laws, terms of service, etc. while performing their automations, some embodiments implement access control and governance restrictions at the robot and/or robot design application level. This may provide an added level of security and compliance into to the automation process development pipeline in some embodiments by preventing developers from taking dependencies on unapproved software libraries that may either introduce security risks or work in a way that violates policies, regulations, privacy laws, and/or privacy policies. See U.S. Nonprovisional patent application Ser. No. 16/924,499, which is incorporated by reference for all it contains.

The management functionality may provide management, deployment, and optimization of automations across an organization. The management functionality may include orchestration, test management, AI functionality, and/or insights in some embodiments. Management functionality of hyper-automation system 100 may also act as an integration point with third-party solutions and applications for automation applications and/or RPA robots. The management capabilities of hyper-automation system 100 may include, but are not limited to, facilitating provisioning, deployment, configuration, queuing, monitoring, logging, and interconnectivity of RPA robots, among other things.

A conductor application, such as UiPath Orchestrator™ (which may be provided as part of the UiPath Automation Cloud™ in some embodiments, or on premises, in VMs, in a private or public cloud, in a Linux™ VM, or as a cloud native single container suite via UiPath Automation Suite™), provides orchestration capabilities to deploy, monitor, optimize, scale, and ensure security of RPA robot deployments. A test suite (e.g., UiPath Test Suite™) may provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

A data service (e.g., UiPath Data Service™) may be stored in database 140, for example, and bring data into a single, scalable, secure place with a drag-and-drop storage interface. Some embodiments may provide low-code or no-code data modeling and storage to automations while ensuring seamless access, enterprise-grade security, and scalability of the data. AI functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models from the AI center, such as AI/ML models 132. Performance of the AI/ML models may be monitored, and be trained and improved using human-validated data, such as that provided by data review center 160. Human reviewers may provide labeled data to core hyper-automation system 120 via a review application 152 on computing systems 154. For instance, human reviewers may validate that predictions by AI/ML models 132 are accurate or provide corrections otherwise. This dynamic input may then be saved as training data for retraining AI/ML models 132, and may be stored in a database such as database 140, for example. The AI center may then schedule and execute training jobs to train the new versions of the AI/ML models using the training data. Both positive and negative examples may be stored and used for retraining of AI/ML models 132.

The engagement functionality engages humans and automations as one team for seamless collaboration on desired processes. Low-code applications may be built (e.g., via UiPath Apps™) to connect browser tabs and legacy software, even that lacking APIs in some embodiments. Applications may be created quickly using a web browser through a rich library of drag-and-drop controls, for instance. An application can be connected to a single automation or multiple automations.

An action center (e.g., UiPath Action Center™) provides a straightforward and efficient mechanism to hand off processes from automations to humans, and vice versa. Humans may provide approvals or escalations, make exceptions, etc. The automation may then perform the automatic functionality of a given workflow.

A local assistant may be provided as a launchpad for users to launch automations (e.g., UiPath Assistant™). This functionality may be provided in a tray provided by an operating system, for example, and may allow users to interact with RPA robots and RPA robot-powered applications on their computing systems. An interface may list automations approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

Chatbots (e.g., UiPath Chatbots™), social messaging applications, and/or voice commands may enable users to run automations. This may simplify access to information, tools, and resources users need in order to interact with customers or perform other activities. Conversations between people may be readily automated, as with other processes. Trigger RPA robots kicked off in this manner may perform operations such as checking an order status, posting data in a CRM, etc., potentially using plain language commands.

End-to-end measurement and government of an automation program at any scale may be provided by hyper-automation system 100 in some embodiments. Per the above, analytics may be employed to understand the performance of automations (e.g., via UiPath Insights™). Data modeling and analytics using any combination of available business metrics and operational insights may be used for various automated processes. Custom-designed and pre-built dashboards allow data to be visualized across desired metrics, new analytical insights to be discovered, performance indicators to be tracked, ROI to be discovered for automations, telemetry monitoring to be performed on user computing systems, errors and anomalies to be detected, and automations to be debugged. An automation management console (e.g., UiPath Automation Ops™) may be provided to manage automations throughout the automation lifecycle. An organization may govern how automations are built, what users can do with them, and which automations users can access.

Hyper-automation system 100 provides an iterative platform in some embodiments. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

Figure 2:
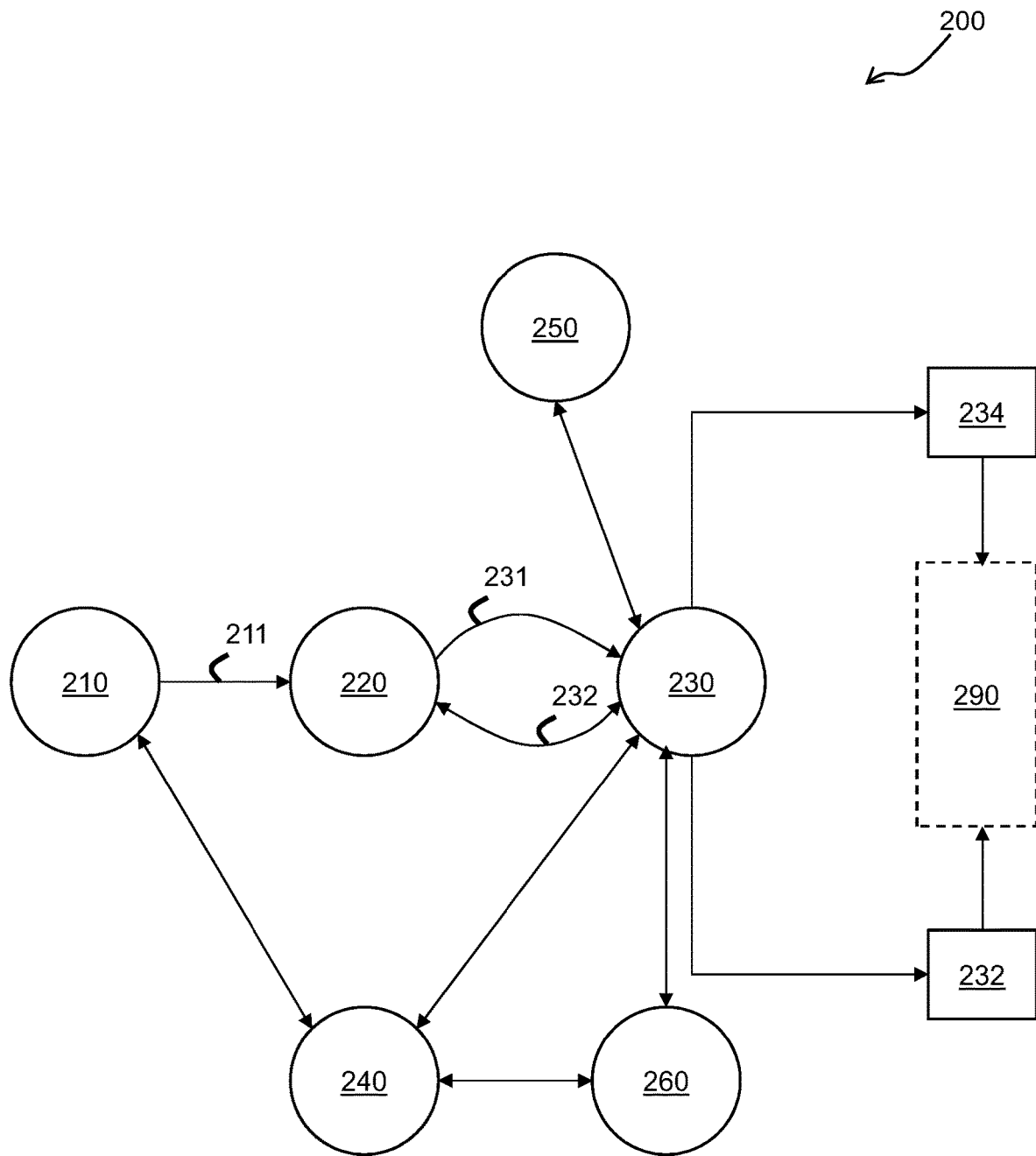
FIG. 2 depicts an architectural diagram illustrating a RPA system according to one or more embodiments.

FIG. 2 is an architectural diagram illustrating an RPA system 200, according to one or more embodiments. In some embodiments, RPA system 200 is part of hyper-automation system 100 of FIG. 1. RPA system 200 includes a designer 210 that allows a developer to design and implement workflows. Designer 210 may provide a solution for application integration, as well as automating third-party applications, administrative Information Technology (IT) tasks, and business IT processes. Designer 210 may facilitate development of an automation project, which is a graphical representation of a business process. Simply put, designer 210 facilitates the development and deployment (as represented by arrow 211) of workflows and robots. In some embodiments, designer 210 may be an application that runs on a user's desktop, an application that runs remotely in a VM, a web application, etc.

The automation project enables automation of rule-based processes by giving the developer control of the execution order and the relationship between a custom set of steps developed in a workflow, defined herein as "activities" per the above. One commercial example of an embodiment of designer 210 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 210, execution of business processes is orchestrated by conductor 220, which orchestrates one or more robots 230 that execute the workflows developed in designer 210. One commercial example of an embodiment of conductor 220 is UiPath Orchestrator™. Conductor 220 facilitates management of the creation, monitoring, and deployment of resources in an environment. Conductor 220 may act as an integration point with third-party solutions and applications. Per the above, in some embodiments, conductor 220 may be part of core hyper-automation system 120 of FIG. 1.

Conductor 220 may manage a fleet of robots 230, connecting and executing (as represented by arrow 231) robots 230 from a centralized point. Types of robots 230 that may be managed include, but are not limited to, attended robots 232, unattended robots 234, development robots (similar to unattended robots 234, but used for development and testing purposes), and nonproduction robots (similar to attended robots 232, but used for development and testing purposes). Attended robots 232 are triggered by user events and operate alongside a human on the same computing system. Attended robots 232 may be used with conductor 220 for a centralized process deployment and logging medium. Attended robots 232 may help the human user accomplish various tasks, and may be triggered by user events. In some embodiments, processes cannot be started from conductor 220 on this type of robot and/or they cannot run under a locked screen. In certain embodiments, attended robots 232 can only be started from a robot tray or from a command prompt. Attended robots 232 should run under human supervision in some embodiments.

Unattended robots 234 run unattended in virtual environments and can automate many processes. Unattended robots 234 may be responsible for remote execution, monitoring, scheduling, and providing support for work queues. Debugging for all robot types may be run in designer 210 in some embodiments. Both attended and unattended robots may automate (as represented by dashed box 290) various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 220 may have various capabilities (as represented by arrow 232) including, but not limited to, provisioning, deployment, configuration, queueing, monitoring, logging, and/or providing interconnectivity. Provisioning may include creating and maintenance of connections between robots 230 and conductor 220 (e.g., a web application). Deployment may include assuring the correct delivery of package versions to assigned robots 230 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., a structured query language (SQL) or NoSQL database) and/or another storage mechanism (e.g., ElasticSearch®, which provides the ability to store and quickly query large datasets). Conductor 220 may provide interconnectivity by acting as the centralized point of communication for third-party solutions and/or applications.

Robots 230 are execution agents that implement workflows built in designer 210. One commercial example of some embodiments of robot(s) 230 is UiPath Robots™. In some embodiments, robots 230 install the Microsoft Windows® Service Control Manager (SCM)-managed service by default. As a result, such robots 230 can open interactive Windows® sessions under the local system account, and have the rights of a Windows® service.

In some embodiments, robots 230 can be installed in a user mode. For such robots 230, this means they have the same rights as the user under which a given robot 230 has been installed. This feature may also be available for High Density (HD) robots, which ensure full utilization of each machine at its maximum potential. In some embodiments, any type of robot 230 may be configured in an HD environment.

Robots 230 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 220 and the execution hosts (i.e., the computing systems on which robots 230 are executed). These services are trusted with and manage the credentials for robots 230. A console application is launched by the SCM under the local system.

User mode robot services in some embodiments manage and monitor Windows® sessions and act as a proxy between conductor 220 and the execution hosts. User mode robot services may be trusted with and manage the credentials for robots 230. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 230 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 210 may also be independent of browser zoom level in some embodiments. For applications that are DPI-unaware or intentionally marked as unaware, DPI may be disabled in some embodiments.

RPA system 200 in this embodiment is part of a hyperautomation system. Developers may use designer 210 to build and test RPA robots that utilize AI/ML models deployed in core hyper-automation system 240 (e.g., as part of an AI center thereof). Such RPA robots may send input for execution of the AI/ML model(s) and receive output therefrom via core hyper-automation system 240.

One or more of robots 230 may be listeners, as described above. These listeners may provide information to core hyper-automation system 240 regarding what users are doing when they use their computing systems. This information may then be used by core hyper-automation system for process mining, task mining, task capture, etc.

An assistant/chatbot 250 may be provided on user computing systems to allow users to launch RPA local robots. The assistant may be located in a system tray, for example. Chatbots may have a user interface so users can see text in the chatbot. Alternatively, chatbots may lack a user interface and run in the background, listening using the computing system's microphone for user speech.

In some embodiments, data labeling may be performed by a user of the computing system on which a robot is executing or on another computing system that the robot provides information to. For instance, if a robot calls an AI/ML model that performs CV on images for VM users, but the AI/ML model does not correctly identify a button on the screen, the user may draw a rectangle around the misidentified or non-identified component and potentially provide text with a correct identification. This information may be provided to core hyper-automation system 240 and then used later for training a new version of the AI/ML model.

Figure 3:
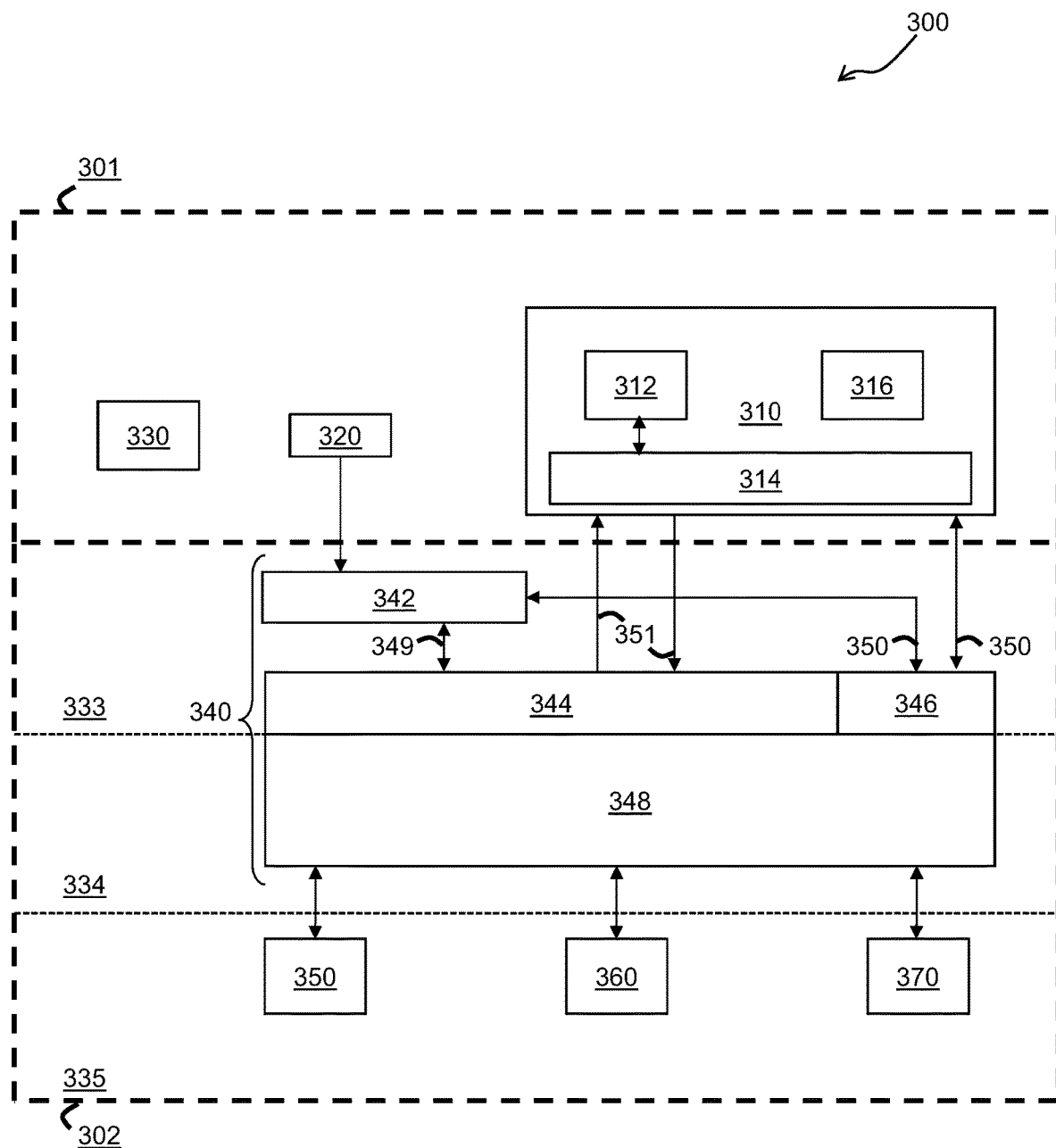
FIG. 3 depicts an architectural diagram illustrating a deployed RPA system, according to one or more embodiments.

FIG. 3 is an architectural diagram illustrating a deployed RPA system 300, according to one or more embodiments. In some embodiments, RPA system 300 may be a part of RPA system 200 of FIG. 2 and/or hyper-automation system 100 of FIG. 1. Deployed RPA system 300 may be a cloud-based system, an on-premises system, a desktop-based system that offers enterprise level, user level, or device level automation solutions for automation of different computing processes, etc.

It should be noted that a client side 301, a server side 302, or both, may include any desired number of computing systems without deviating from the scope of the one or more embodiments herein. On the client side 301, a robot application 310 includes executors 312, an agent 314, and a designer 316. However, in some embodiments, designer 316 may not be running on the same computing system as executors 312 and agent 314. Executors 312 are running processes. Several business projects may run simultaneously, as shown in FIG. 3. Agent 314 (e.g., a Windows® service) is the single point of contact for all executors 312 in this embodiment. All messages in this embodiment are logged into conductor 340, which processes them further via database server 355, an AI/ML server 360, an indexer server 370, or any combination thereof. As discussed above with respect to FIG. 2, executors 312 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 314 is also responsible for sending the status of the robot (e.g., periodically sending a "heartbeat" message indicating that the robot is still functioning) and downloading the required version of the package to be executed. The communication between agent 314 and conductor 340 is always initiated by agent 314 in some embodiments. In the notification scenario, agent 314 may open a WebSocket channel that is later used by conductor 330 to send commands to the robot (e.g., start, stop, etc.).

A listener 330 monitors and records data pertaining to user interactions with an attended computing system and/or operations of an unattended computing system on which listener 330 resides. Listener 330 may be an RPA robot, part of an operating system, a downloadable application for the respective computing system, or any other software and/or hardware without deviating from the scope of the one or more embodiments herein. Indeed, in some embodiments, the logic of the listener is implemented partially or completely via physical hardware.

On the server side 302, a presentation layer 333, a service layer 334, and a persistence layer 336 are included, as well as a conductor 340. The presentation layer 333 can include a web application 342, Open Data Protocol (OData) Representative State Transfer (REST) Application Programming Interface (API) endpoints 344, and notification and monitoring 346. The service layer 334 can include API implementation/business logic 348. The persistence layer 336 can include a database server 355, an AI/ML server 360, and an indexer server 370. For example, the conductor 340 includes the web application 342, the OData REST API endpoints 344, the notification and monitoring 346, and the API implementation/business logic 348. In some embodiments, most actions that a user performs in the interface of the conductor 340 (e.g., via browser 320) are performed by calling various APIs. Such actions may include, but are not limited to, starting jobs on robots, adding/removing data in queues, scheduling jobs to run unattended, etc. without deviating from the scope of the one or more embodiments herein. The web application 342 can be the visual layer of the server platform. In this embodiment, the web application 342 uses Hypertext Markup Language (HTML) and JavaScript (JS). However, any desired markup languages, script languages, or any other formats may be used without deviating from the scope of the one or more embodiments herein. The user interacts with web pages from the web application 342 via the browser 320 in this embodiment in order to perform various actions to control conductor 340. For instance, the user may create robot groups, assign packages to the robots, analyze logs per robot and/or per process, start and stop robots, etc.

In addition to web application 342, conductor 340 also includes service layer 334 that exposes OData REST API endpoints 344. However, other endpoints may be included without deviating from the scope of the one or more embodiments herein. The REST API is consumed by both web application 342 and agent 314. Agent 314 is the supervisor of one or more robots on the client computer in this embodiment.

The REST API in this embodiment includes configuration, logging, monitoring, and queueing functionality (represented by at least arrow 349). The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 340. Queueing REST endpoints may be responsible for queues and queue item management, such as adding data to a queue, obtaining a transaction from the queue, setting the status of a transaction, etc.

Monitoring REST endpoints may monitor web application 342 and agent 314. Notification and monitoring API 346 may be REST endpoints that are used for registering agent 314, delivering configuration settings to agent 314, and for sending/receiving notifications from the server and agent 314. Notification and monitoring API 346 may also use WebSocket communication in some embodiments. As shown in FIG. 3, one or more the activities/actions described herein are represented by arrows 350 and 351.

The APIs in the service layer 334 may be accessed through configuration of an appropriate API access path in some embodiments, e.g., based on whether conductor 340 and an overall hyper-automation system have an on-premises deployment type or a cloud-based deployment type. APIs for conductor 340 may provide custom methods for querying stats about various entities registered in conductor 340. Each logical resource may be an OData entity in some embodiments. In such an entity, components such as the robot, process, queue, etc., may have properties, relationships, and operations. APIs of conductor 340 may be consumed by web application 342 and/or agents 314 in two ways in some embodiments: by getting the API access information from conductor 340, or by registering an external application to use the OAuth flow.

The persistence layer 336 includes a trio of servers in this embodiment-database server 355 (e.g., a SQL server), AI/ML server 360 (e.g., a server providing AI/ML model serving services, such as AI center functionality) and indexer server 370. Database server 355 in this embodiment stores the configurations of the robots, robot groups, associated processes, users, roles, schedules, etc. This information is managed through web application 342 in some embodiments. Database server 355 may manage queues and queue items. In some embodiments, database server 355 may store messages logged by the robots (in addition to or in lieu of indexer server 370). Database server 355 may also store process mining, task mining, and/or task capture-related data, received from listener 330 installed on the client side 301, for example. While no arrow is shown between listener 330 and database 355, it should be understood that listener 330 is able to communicate with database 355, and vice versa in some embodiments. This data may be stored in the form of PDDs, images, XAML files, etc. Listener 330 may be configured to intercept user actions, processes, tasks, and performance metrics on the respective computing system on which listener 330 resides. For example, listener 330 may record user actions (e.g., clicks, typed characters, locations, applications, active elements, times, etc.) on its respective computing system and then convert these into a suitable format to be provided to and stored in database server 355.

AI/ML server 360 facilitates incorporation of AI/ML models into automations. Pre-built AI/ML models, model templates, and various deployment options may make such functionality accessible even to those who are not data scientists. Deployed automations (e.g., RPA robots) may call AI/ML models from AI/ML server 360. Performance of the AI/ML models may be monitored, and be trained and improved using human-validated data. AI/ML server 360 may schedule and execute training jobs to train new versions of the AI/ML models.

AI/ML server 360 may store data pertaining to AI/ML models and ML packages for configuring various ML skills for a user at development time. An ML skill, as used herein, is a pre-built and trained ML model for a process, which may be used by an automation, for example. AI/ML server 460 may also store data pertaining to document understanding technologies and frameworks, algorithms and software packages for various AI/ML capabilities including, but not limited to, intent analysis, natural language processing (NLP), speech analysis, different types of AI/ML models, etc.

Indexer server 370, which is optional in some embodiments, stores and indexes the information logged by the robots. In certain embodiments, indexer server 370 may be disabled through configuration settings. In some embodiments, indexer server 370 uses ElasticSearch®, which is an open source project full-text search engine. Messages logged by robots (e.g., using activities like log message or write line) may be sent through the logging REST endpoint(s) to indexer server 370, where they are indexed for future utilization.

Figure 4:
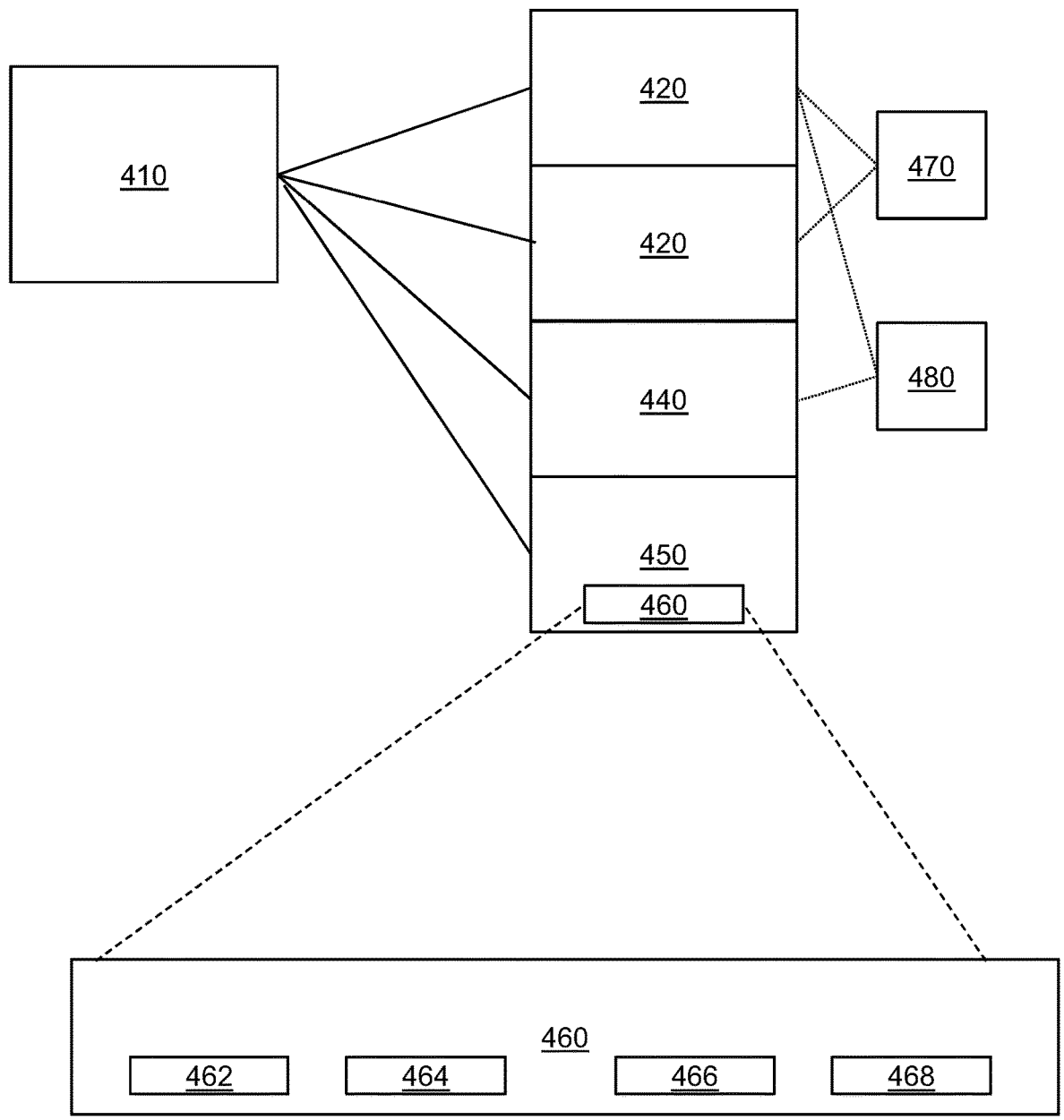
FIG. 4 depicts an architectural diagram illustrating relationships between a designer, activities, and drivers according to one or more embodiments.

FIG. 4 is an architectural diagram illustrating the relationship between a designer 410, activities 420, 430, 440, 450, drivers 460, APIs 470, and AI/ML models 480 according to one or more embodiments. As described herein, a developer uses the designer 410 to develop workflows that are executed by robots. The various types of activities may be displayed to the developer in some embodiments. Designer 410 may be local to the user's computing system or remote thereto (e.g., accessed via VM or a local web browser interacting with a remote web server). Workflows may include user-defined activities 420, API-driven activities 430, AI/ML activities 440, and/or and UI automation activities 450. By way of example (as shown by the dotted lines), user-defined activities 420 and API-driven activities 440 interact with applications via their APIs. In turn, User-defined activities 420 and/or AI/ML activities 440 may call one or more AI/ML models 480 in some embodiments, which may be located locally to the computing system on which the robot is operating and/or remotely thereto.

Some embodiments are able to identify non-textual visual components in an image, which is called CV herein. CV may be performed at least in part by AI/ML model(s) 480. Some CV activities pertaining to such components may include, but are not limited to, extracting of text from segmented label data using OCR, fuzzy text matching, cropping of segmented label data using ML, comparison of extracted text in label data with ground truth data, etc. In some embodiments, there may be hundreds or even thousands of activities that may be implemented in user-defined activities 420. However, any number and/or type of activities may be used without deviating from the scope of the one or more embodiments herein.

UI automation activities 450 are a subset of special, lower-level activities that are written in lower-level code and facilitate interactions with the screen. UI automation activities 450 facilitate these interactions via drivers 460 that allow the robot to interact with the desired software. For instance, drivers 460 may include operating system (OS) drivers 462, browser drivers 464, VM drivers 466, enterprise application drivers 468, etc. One or more of AI/ML models 480 may be used by UI automation activities 450 in order to perform interactions with the computing system in some embodiments. In certain embodiments, AI/ML models 480 may augment drivers 460 or replace them completely. Indeed, in certain embodiments, drivers 460 are not included.

Drivers 460 may interact with the OS at a low level looking for hooks, monitoring for keys, etc. via OS drivers 462. Drivers 460 may facilitate integration with Chrome®, IE®, Citrix®, SAP®, etc. For instance, the "click" activity performs the same role in these different applications via drivers 460.

Figure 5:
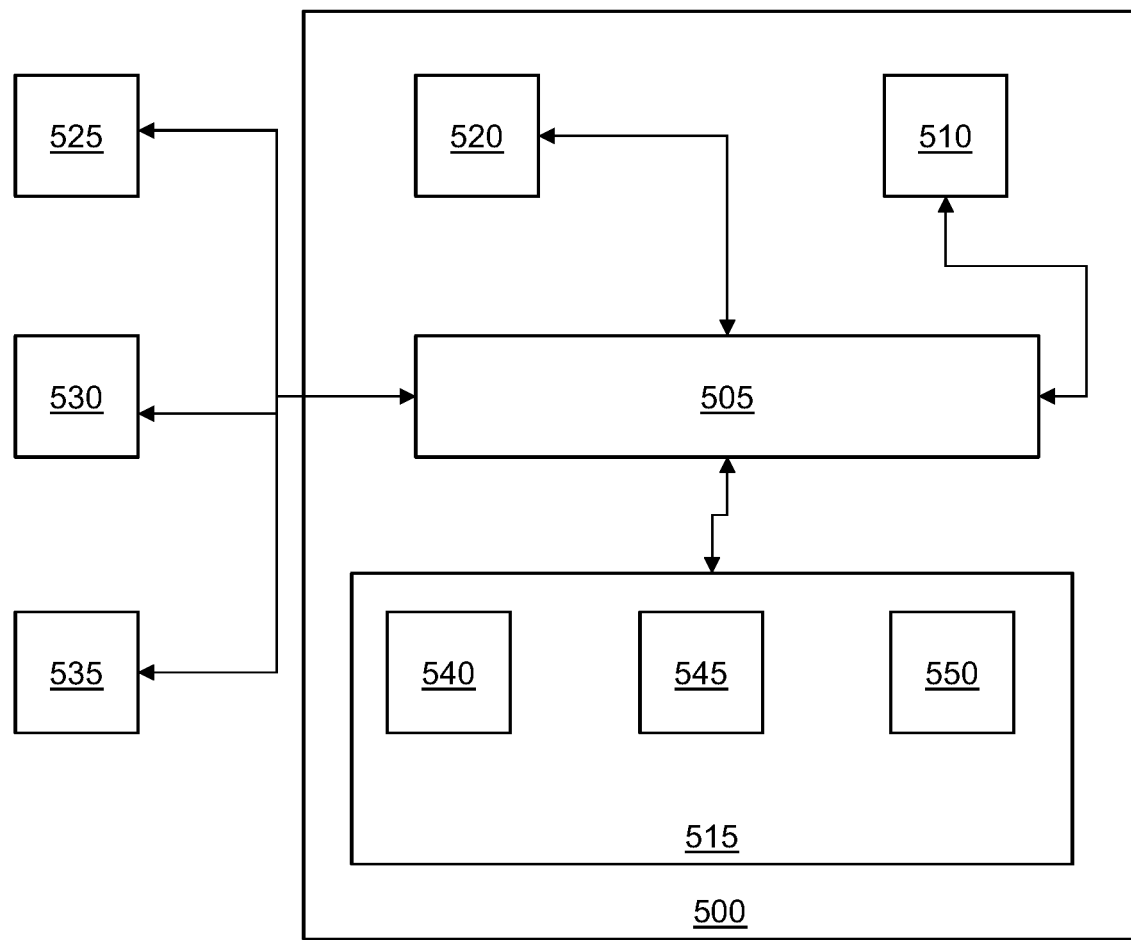
FIG. 5 depicts an architectural diagram illustrating a computing system according to one or more embodiments.

FIG. 5 is an architectural diagram illustrating a computing system 500 configured to provide a determination engine for automatically generating a graphic user interface heatmap of most used system transaction with test automation details according to one or more embodiments. In some embodiments, computing system 500 may be one or more of the computing systems depicted and/or described herein. In certain embodiments, computing system 500 may be part of a hyper-automation system, such as that shown in FIGS. 1 and 2. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G) New Radio (NR), any combination thereof, and/or any other currently existing or future-implemented communications standard and/or protocol without deviating from the scope of the one or more embodiments herein. In some embodiments, communication device 520 may include one or more antennas that are singular, arrayed, panels, phased, switched, beamforming, beamsteering, a combination thereof, and or any other antenna configuration without deviating from the scope of the one or more embodiments herein.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the one or more embodiments herein.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a module 545 (which is representative of a determination engine comprising RPA and visualization software for automatically implementing/generating a graphic user interface heatmap with test automation details) that is configured to perform all or part of the processes described herein or derivatives thereof. The module 545 can include software code to generate the graphic user interface heatmap and provide filters, mouse hovering detection, configurable settings, test case views, test set views, and overall transaction views therewith. The filters can provide an additional possibility to set a focus on most relevant transactions and select relevant dates, as well as visualize the same within the graphic user interface heatmap. The mouse hovering detection can provide additional information about a test case execution state, as well as visualize the same within the graphic user interface heatmap. The configurable settings can provide selectable options where users configure and change calculated values to determine a test relevancy, or adjust said values per a user need. The test case views (for a selected transaction/process from the graphic user interface heatmap) can present views of all assigned test cases, create a new test case, or review an execution state. The test set views (for a selected transaction/process from the graphic user interface heatmap) can present views of all assigned test sets and immediately execute presented test sets automatically or manually. The overall transaction views (for a selected transaction) can provide access to more detailed information of the selected transaction. The module 545 can be added to a software system or an independent application. One or more technical effects, advantages, and benefits of the module 545 (i.e., the determination engine) include providing analytics for test coverage and test relevance of real used transaction of software system, reducing analysis time for analyzing the usage data extracted using a collection program, and guiding the new user to understand test opportunities in the collection program with usage data visualization. Thus, the module 545 is necessarily rooted in the operations of the computing system 500 to improve the functioning thereof.

Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the one or more embodiments herein. Presenting the above-described functions as being performed by a "system" is not intended to limit the scope of embodiments herein in any way, but is intended to provide one example of the many embodiments. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the one or more embodiments herein.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the one or more embodiments herein.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
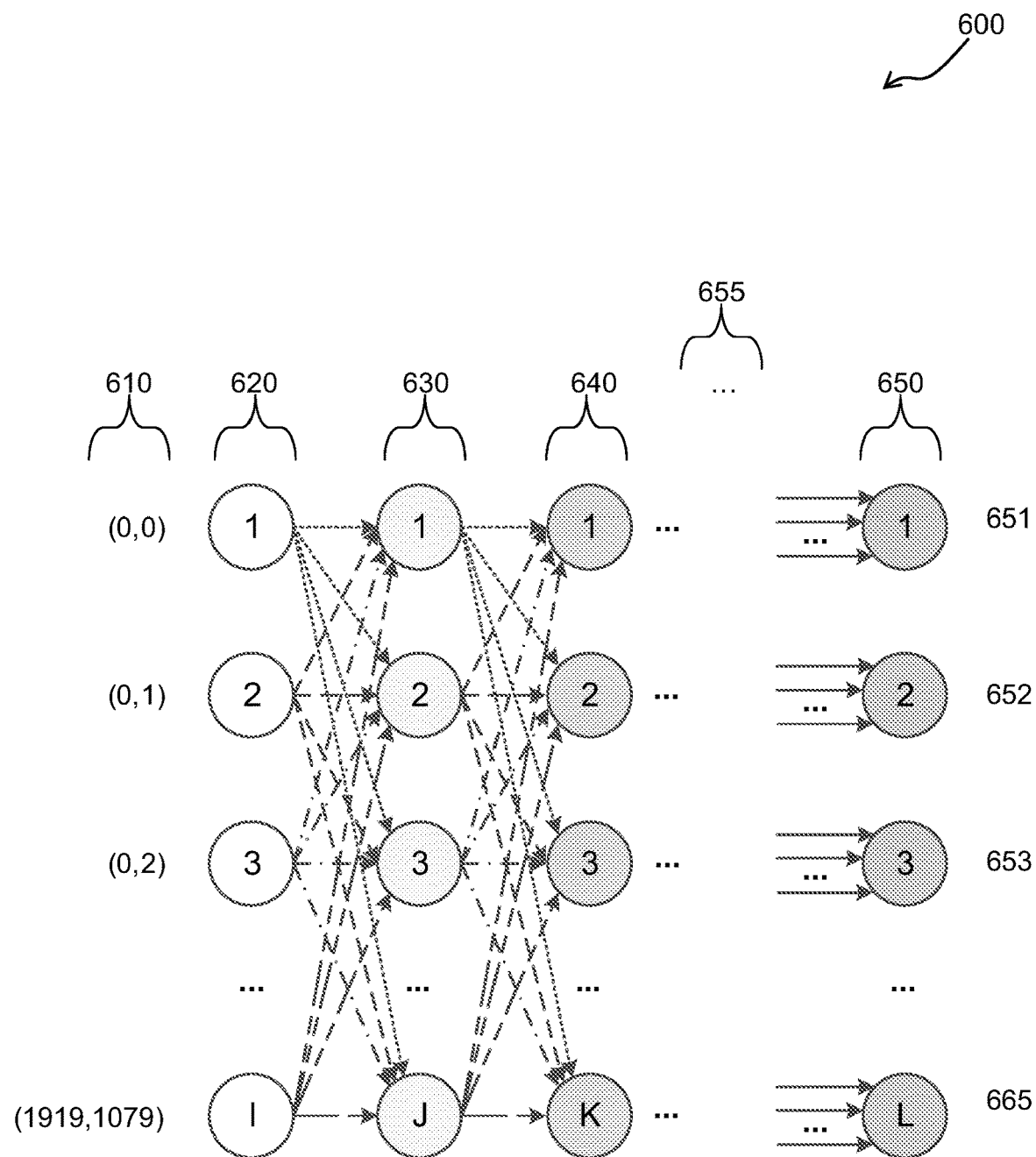
FIG. 6 illustrates an example of a neural network that has been trained to recognize graphical elements in an image according to one or more embodiments.

Various types of AI/ML models may be trained and deployed without deviating from the scope of the one or more embodiments herein. For instance, FIG. 6 illustrates an example of a neural network 600 that has been trained to recognize graphical elements in an image according to one or more embodiments. Here, neural network 600 receives pixels (as represented by column 610) of a screenshot image of a 1920×1080 screen as input for input "neurons" 1 to I of an input layer (as represented by column 620). In this case, I is 2,073,600, which is the total number of pixels in the screenshot image.

Neural network 600 also includes a number of hidden layers (as represented by column 630 and 640). Both DLNNs and shallow learning neural networks (SLNNs) usually have multiple layers, although SLNNs may only have one or two layers in some cases, and normally fewer than DLNNs. Typically, the neural network architecture includes the input layer, multiple intermediate layers (e.g., the hidden layers), and an output layer (as represented by column 650), as is the case in neural network 600.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 6, pixels provided as the input layer are fed as inputs to the J neurons of hidden layer 1. While all pixels are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the one or more embodiments herein.

Hidden layer 2 (630) receives inputs from hidden layer 1 (620), hidden layer 3 receives inputs from hidden layer 2 (630), and so on for all hidden layers until the last hidden layer (as represented by the ellipses 655) provides its outputs as inputs for the output layer. It should be noted that numbers of neurons I, J, K, and L are not necessarily equal, and thus, any desired number of layers may be used for a given layer of neural network 600 without deviating from the scope of the one or more embodiments herein. Indeed, in certain embodiments, the types of neurons in a given layer may not all be the same.

Neural network 600 is trained to assign a confidence score to graphical elements believed to have been found in the image. In order to reduce matches with unacceptably low likelihoods, only those results with a confidence score that meets or exceeds a confidence threshold may be provided in some embodiments. For instance, if the confidence threshold is 80%, outputs with confidence scores exceeding this amount may be used and the rest may be ignored. In this case, the output layer indicates that two text fields (as represented by outputs 661 and 662), a text label (as represented by output 663), and a submit button (as represented by output 665) were found. Neural network 600 may provide the locations, dimensions, images, and/or confidence scores for these elements without deviating from the scope of the one or more embodiments herein, which can be used subsequently by an RPA robot or another process that uses this output for a given purpose.

It should be noted that neural networks are probabilistic constructs that typically have a confidence score. This may be a score learned by the AI/ML model based on how often a similar input was correctly identified during training. For instance, text fields often have a rectangular shape and a white background. The neural network may learn to identify graphical elements with these characteristics with a high confidence. Some common types of confidence scores include a decimal number between 0 and 1 (which can be interpreted as a percentage of confidence), a number between negative ∞ and positive ∞, or a set of expressions (e.g., "low," "medium," and "high"). Various post-processing calibration techniques may also be employed in an attempt to obtain a more accurate confidence score, such as temperature scaling, batch normalization, weight decay, negative log likelihood (NLL), etc.

"Neurons" in a neural network are mathematical functions that that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 7:
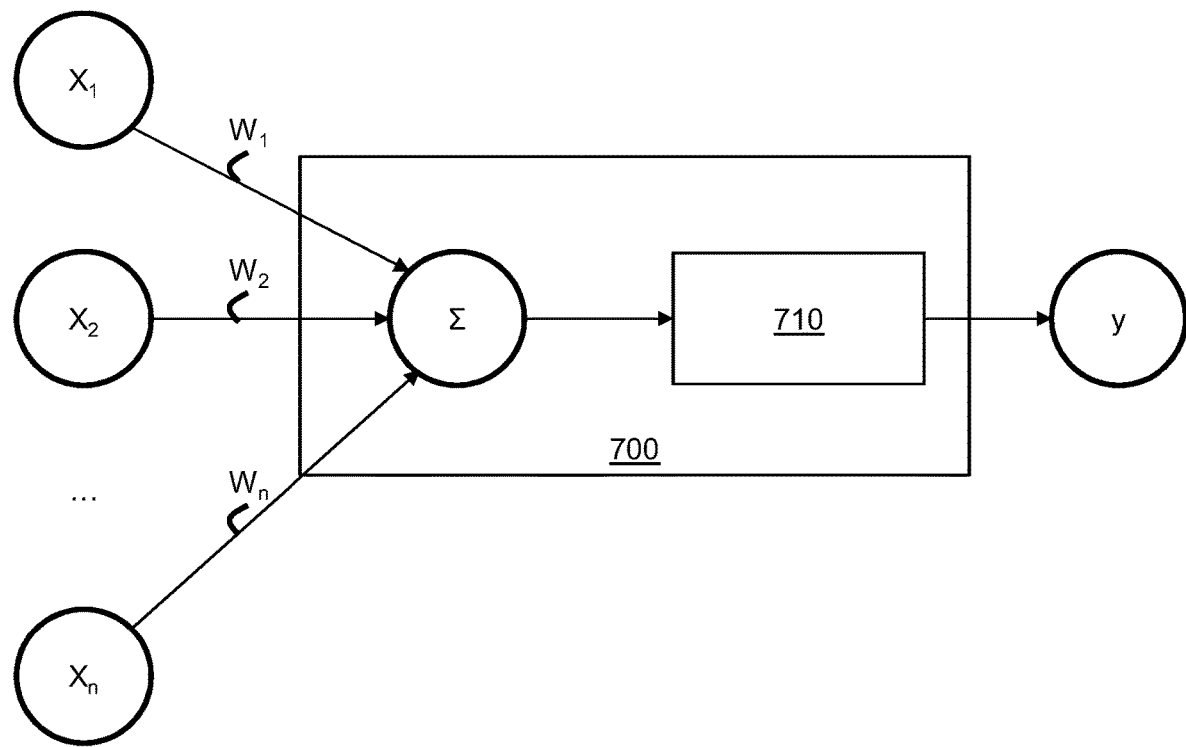
FIG. 7 illustrates an example of a neuron according to one or more embodiments.

An example of a neuron 700 is shown in FIG. 7. Inputs $x_1, x_2, \ldots, x_n$ from a preceding layer are assigned respective weights $w_1, w_2, \ldots, w_n$. Thus, the collective input from preceding neuron 1 is $w_1 x_1$. These weighted inputs are used for the neuron's summation function modified by a bias, such as:

$$\sum_{i=1}^{m}(w_i x_i) + \text{bias} \quad (1)$$

This summation is compared against an activation function $f(x)$ (as represented by block 710) to determine whether the neuron "fires". For instance, $f(x)$ may be given by:

$$f(x) = \begin{cases} 1 & \text{if } \sum wx + \text{bias} \geq 0 \\ 0 & \text{if } \sum wx + \text{bias} < 0 \end{cases} \quad (2)$$

The output y of neuron 700 may thus be given by:

$$y = f(x) \sum_{i=1}^{m}(w_i x_i) + \text{bias} \quad (3)$$

In this case, neuron 700 is a single-layer perceptron. However, any suitable neuron type or combination of neuron types may be used without deviating from the scope of the one or more embodiments herein. It should also be noted that the ranges of values of the weights and/or the output value(s) of the activation function may differ in some embodiments without deviating from the scope of the one or more embodiments herein.

The goal, or "reward function" is often employed, such as for this case the successful identification of graphical elements in the image. A reward function explores intermediate transitions and steps with both short-term and long-term rewards to guide the search of a state space and attempt to achieve a goal (e.g., successful identification of graphical elements, successful identification of a next sequence of activities for an RPA workflow, etc.).

During training, various labeled data (in this case, images) are fed through neural network 600. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide indications of where non-identified graphical elements are, provide corrections of misidentified graphical elements, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer $i=1, \ldots, N$ of the network, with the output at a given layer first multiplied by a synaptic matrix $W_i$, and with a bias vector $b_i$ added. The network output o, given by $$o = f_N(W_N f_{N-1}(W_{N-1} f_{N-2}(\ldots f_1(W_1 x + b_1) \ldots) + b_{N-1}) + b_N) \quad (4)$$

In some embodiments, o is compared with a target output t, resulting in an error $E = \frac{1}{2} \|o - t\|^2$, which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $p_j(n_j) = f'_j(n_j)$, where $n_j$ is the network activity at layer j (i.e., $n_j = W_j o_{j-1} + b_j$) where $o_j = f_j(n_j)$ and the apostrophe ' denotes the derivative of the activity function $f$.

The weight updates may be computed via the formulae:

$$d_j = \begin{cases} (o - t) \circ p_j(n_j), & j = N \\ W_{j+1}^T d_{j+1} \circ p_j(n_j), & j < N \end{cases} \quad (5)$$

$$\frac{\partial E}{\partial W_{j+1}} = d_{j+1}(o_j)^T \quad (6)$$

$$\frac{\partial E}{\partial b_{j+1}} = d_{j+1} \quad (7)$$

$$W_j^{new} = W_j^{old} - \eta \frac{\partial E}{\partial W_j} \quad (8)$$

$$b_j^{new} = b_j^{old} - \eta \frac{\partial E}{\partial b_j} \quad (9)$$

where $\circ$ denotes a Hadamard product (i.e., the element-wise product of two vectors), $^T$ denotes the matrix transpose, and $o_j$ denotes $f_j(w_j o_{j-1} + b_j)$, with $o_0 = x$. Here, the learning rate $\eta$ is chosen with respect to machine learning considerations. Below, $\eta$ is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the one or more embodiments herein. Once trained on the training data, the AI/ML model may be tested on a set of evaluation data that the AI/ML model has not encountered before. This helps to ensure that the AI/ML model is not "over fit" such that it identifies graphical elements in the training data well, but does not generalize well to other images.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model.

In certain embodiments, a collection of trained AI/ML models may be used to accomplish a task, such as employing an AI/ML model for each type of graphical element of interest, employing an AI/ML model to perform OCR, deploying yet another AI/ML model to recognize proximity relationships between graphical elements, employing still another AI/ML model to generate an RPA workflow based on the outputs from the other AI/ML models, etc. This may collectively allow the AI/ML models to enable semantic automation, for instance.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Figure 8:
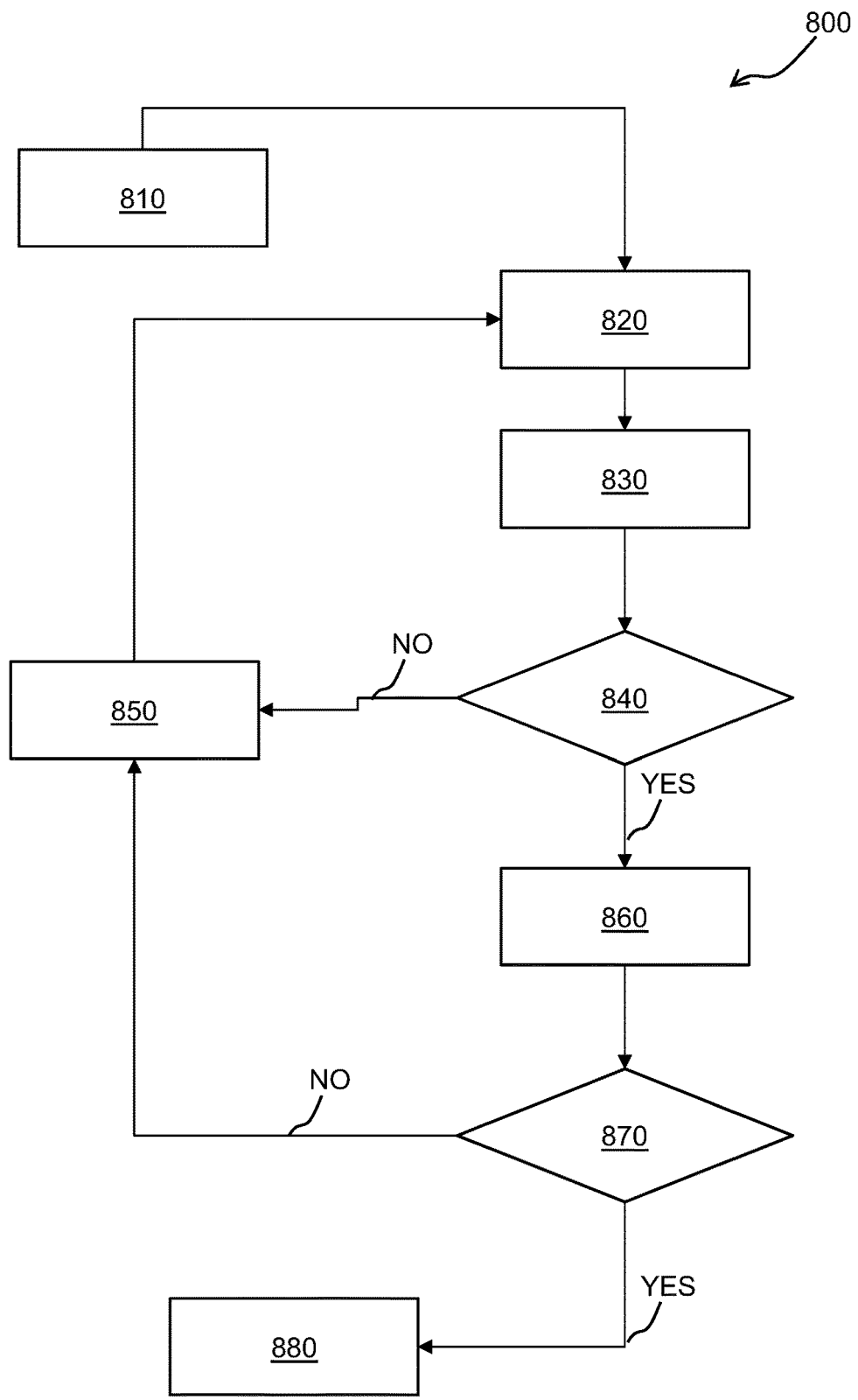
FIG. 8 depicts a flowchart illustrating a process for training AI/ML model(s) according to one or more embodiments.

FIG. 8 is a flowchart illustrating a process 800 for training AI/ML model(s) according to one or more embodiments. Note that the process 800 can also be applied to other UI learning operations, such as for NLP and chatbots. The process begins with training data, for example providing labeled data as illustrated in FIG. 8, such as labeled screens (e.g., with graphical elements and text identified), words and phrases, a "thesaurus" of semantic associations between words and phrases such that similar words and phrases for a given word or phrase can be identified, etc. at block 810. The nature of the training data that is provided will depend on the objective that the AI/ML model is intended to achieve. The AI/ML model is then trained over multiple epochs at block 820 and results are reviewed at block 830.

If the AI/ML model fails to meet a desired confidence threshold at decision block 840 (the process 800 proceeds according to the NO arrow), the training data is supplemented and/or the reward function is modified to help the AI/ML model achieve its objectives better at block 850 and the process returns to block 820. If the AI/ML model meets the confidence threshold at decision block 840 (the process 800 proceeds according to the YES arrow), the AI/ML model is tested on evaluation data at block 860 to ensure that the AI/ML model generalizes well and that the AI/ML model is not over fit with respect to the training data. The evaluation data may include screens, source data, etc. that the AI/ML model has not processed before. If the confidence threshold is met at decision block 870 for the evaluation data (the process 800 proceeds according to the Yes arrow), the AI/ML model is deployed at block 880. If not (the process 800 proceeds according to the NO arrow), the process returns to block 880 and the AI/ML model is trained further.

Figure 9:
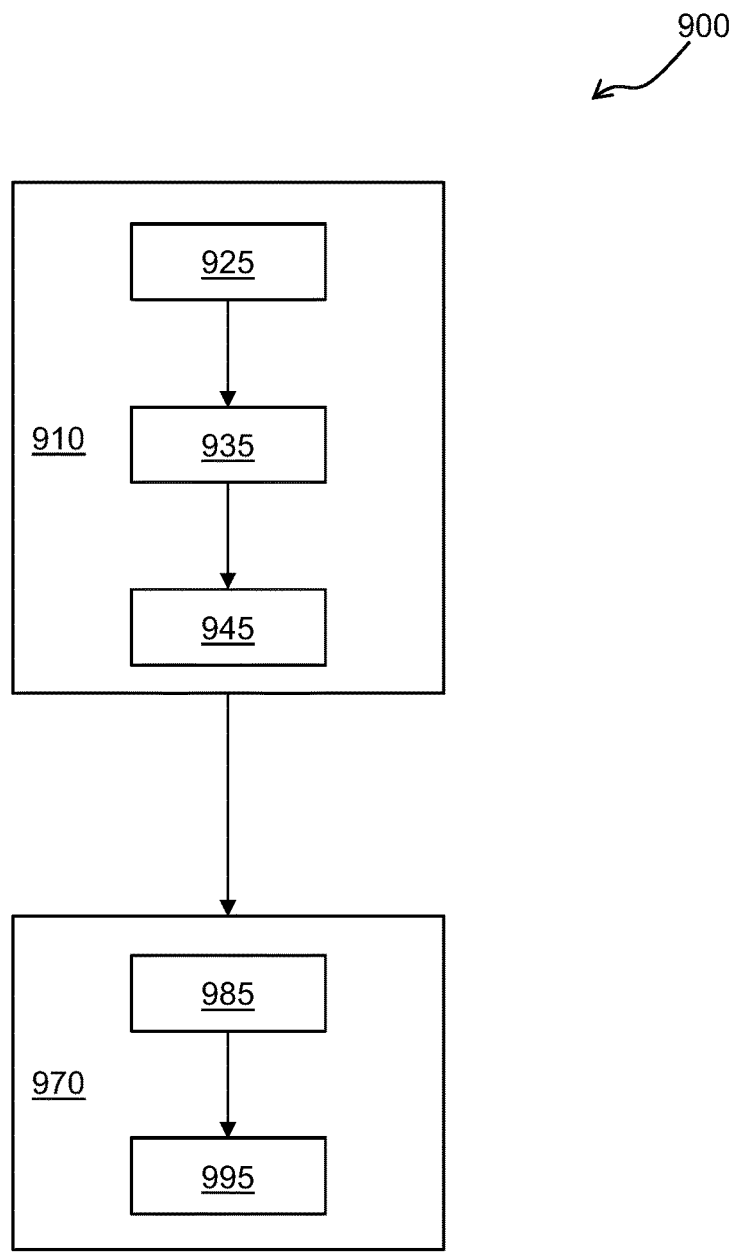
FIG. 9 depicts a flowchart illustrating a process according to one or more embodiments.

FIG. 9 is a flowchart illustrating a process 900 of a determination engine for automatically generating a graphic user interface heatmap of most used system transaction with test automation details according to one or more embodiments according to one or more embodiments. The process 800 performed in FIG. 8 and the process 900 performed in FIG. 9 may be performed by a computer program, encoding instructions for the processor(s), in accordance with one or more embodiments. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 8-9, which may also be stored on the computer-readable medium.

According to one or more embodiments, the process 900 can be considered an example of operations or methods of a determination engine that acquires usage data of a software system and derives analytics out of the usage data. The process 900 can be executed as added software of a software system or an independent application. For example, the method can be applied to one or more of SAP (on-premises) enterprise resource planning central component (ECC), SAP S/4HANA, and SAP extended warehouse management (EWM). The process 900 can include utilizing the derived analytics to generate the graphic user interface heatmap as a visualization of a software system usage.

According to one or more embodiments, the process 900 as implemented by the determination engine can be applicated to one or more use cases, such as an existing user use case and a new user use case (such as of an SAP system). Regarding the existing user use case, the process 900 can enable a review of current testing portfolio, identify test case coverage based on real usage of SAP system, provide insights if automated tests are covering a real used transaction in the SAP system, provide insights if manual tests are covering a real used transaction in the SAP system, and identifying gaps when real used transaction does not have any test in the testing portfolio. Regarding the new user use case, the process 900 can enable rapidly initiating and establishing a project in a short period of time, enable quick jump starts into testing projects from zero, and provide details related to 'what to test' and 'where to start testing'.

One or more technical effects, advantages, and benefits of the method 900 include, but are not limited to, providing analytics for test coverage and test relevance of real used transaction of software system (e.g., providing analytics for test coverage and test relevance of real used transaction of SAP system), reducing analysis time for analyzing the usage data extracted using a collection program (e.g., reducing analysis time for analyzing the usage data extracted using an SAP collection program), and guiding the new user to understand test opportunities in the collection program with usage data visualization (e.g., guiding a new SAP user to understand test opportunities in SAP system with usage data visualization). Another technical effect, benefit, and advantage of the method 900 by the determination engine includes providing a easy to understand view of a usage of a software system and answering questions as to what to test and where to start testing.

The process 900 beings at block 910, where the determination engine executes a data consolidation. The data consolidation can include aggregating data and normalizing that data into consolidated data. For instance, data consolidation by the determination engine can be a custom application or sub-code that performs an analysis of transaction data of a software system to output the consolidated data.

According to one or more embodiments, at sub-block block 925, the determination engine executes a data aggregation. For example, the data aggregation can include the custom application or sub-code of the determination engine that executes or acquires transaction data (e.g., data generated by ST03 system across all servers, users, and transactions, as well as data generated by SAP transactions, SAP Fiori Applications, SAP Webdynpro, SAP WinGUI, SAP WebGUI, or the like) to produce aggregated data. Note that the transaction data is a vast data amount, such as than 10 GB of technical data, that is entirely outside the scope of a human brain's ability to process in any reasonable or cost effective way. According to one or more embodiments, the custom application or sub-code of the determination engine can be a collection program. The collection program can run at time intervals, such as every minute, to aggregate transaction data. The aggregated transaction data can further be accumulated at additional intervals, such as hourly, daily, weekly, etc.

At sub-block 935, the custom application or sub-code executes to consolidate performance data metrics of the aggregated data (i.e., the accumulated transaction data generated by ST03). According to one or more embodiments, the custom application or sub-code consolidates performance data metrics over predefined periods of time, such as a day, a week, and/or month.

At sub-block 945, the aggregated data and the performance data metrics are normalized by the custom application or sub-code to prepare the consolidated data. By way of example, the aggregated data and the performance data metrics can be subjected to transformations, such as per user provided weights, to output the consolidated data.

According to one or more embodiments, the weights can be default weights. A user can also adjust the weights as per their needs/relevance. Examples of one or more categories for weights (e.g., SAP-attributes) include, but are not limited to, users, dialogs/executions, time/execution time, objects/development objects, and intensity/transaction type. By way of further example, SAP attributes can be taken into consideration such that the aggregated data can be transformed by the determination engine as per the provided weights.

Users as a weight can include a number of users using a transaction. In this regard, a greater weight can be given to a transaction in accordance with a number of users. For example, the more users using or executing the transaction, then the more important that transaction can be weighted (therefore a higher weight). For example, a number of users executing a transaction can equate to a weight. The users as a weight can be determined/calculate by the determination engine and/or selected from a range, such as 0.0000 to 1.0000.

Dialogs/executions as a weight can include a number of executions of a transaction. In this regard, a greater weight can be given to a transaction in accordance with a number of executions. For example, the more executions of the transaction, then the more important that transaction can be weighted; therefore a higher weight). By way of further example, the determination engine can determine 'how many "dialog steps" were performed, per one dialog step of one screen in SAP systems. The dialogs/executions as a weight can be determined/calculate by the determination engine and/or selected from a range, such as 0.0000 to 1.0000.

Time/execution time as a weight can include overall processing time of a software system. In this regard, a greater weight can be given to a transaction in accordance with a length of time that transaction execution. For example, the longer a transaction takes to process/execute, then the more that transaction can be weighted. By way of further example, the determination engine can determine a time that SAP systems need to process an action, which can include a graphic user interface time, a database time, a network time, etc. The time/execution time as a weight can be determined/calculate by the determination engine and/or selected from a range, such as 0.0000 to 1.0000.

Objects/development objects as a weight can include a number of development objects. In this regard, a greater weight can be given to an application in accordance with a number of objects. For example, the more objects of an application, then the more that transaction can be weighted. By way of further example, the determination engine can determine development objects of individual parts of advanced business application programming (ABAP) application, such as screens, functional modules, tables, domain, data elements, fields, classes, etc. The objects/development objects as a weight can be determined/calculate by the determination engine and/or selected from a range, such as 0.0000 to 1.0000.

Intensity/transaction type as a weight can include a type of transaction (e.g., create, change, display, testing, etc.). In this regard, a greater weight can be given to different transaction in accordance with a type. According to one or more embodiments, a create type transaction can have a higher importance that a change type transaction. According to one or more embodiments, a display type transaction can have a lower importance that a testing type transaction. According to one or more embodiments, transactions that permit display only can be weighted as less important than transactions that permit insert/update/edit actions. The intensity/transaction type as a weight can be determined/calculate by the determination engine and/or selected from a range, such as 0.0000 to 1.0000.

At block 970, the determination engine executes a data transformation and visualization. Data transformation and visualization by the determination engine can include a custom application or sub-code that calculates final ratings and generates a user interface, respectively.

For example, at sub-block 985, the determination engine implements a data transformation by analyzing the consolidated data utilizing a mathematical algorithm to 'rate' the data therein. According to one or more embodiments, the mathematical algorithm generates the final rating by an average or a weighted average of the one or more categories for weights (e.g., SAP-attributes; or users, dialogs/executions, time/execution time, objects/development objects, and intensity/transaction type). The final rating can indicate a relevance of data (e.g., a test relevance) or a degree of strength of transaction. The final rating can give guidance as to 'where to start an automation'. Once the consolidated data is transformed into the transformed data with final ratings (as per the provided weights), all test cases related to an existing transactions in the transformed data are identified and executed by the determination engine. The test cases can be identified using transaction labels associated therewith. For instance, the test cases can be identified using SAP transaction or SAP programs labels.

Further, at sub-block 995, the determination engine generates the user interface that visually presents the transformed data. According to one or more embodiments, the user interface includes a heatmap with one or more elements, each of which include one or more credentials. For example, the one or more elements can be shapes, such as boxes, of the heatmap. Further, the one or more credentials can include a size and/or a color of the shapes. An example credential can be the final rating, which can be represented as a 'size' of a box. The final rating or size can be derived by an average or a weighted average of the one or more categories for weights (e.g., SAP-attributes; or users, dialogs/executions, time/execution time, objects/development objects, and intensity/transaction type). According to one or more embodiments, the final rating can give guidance as to 'where to start an automation'.

Figure 10:
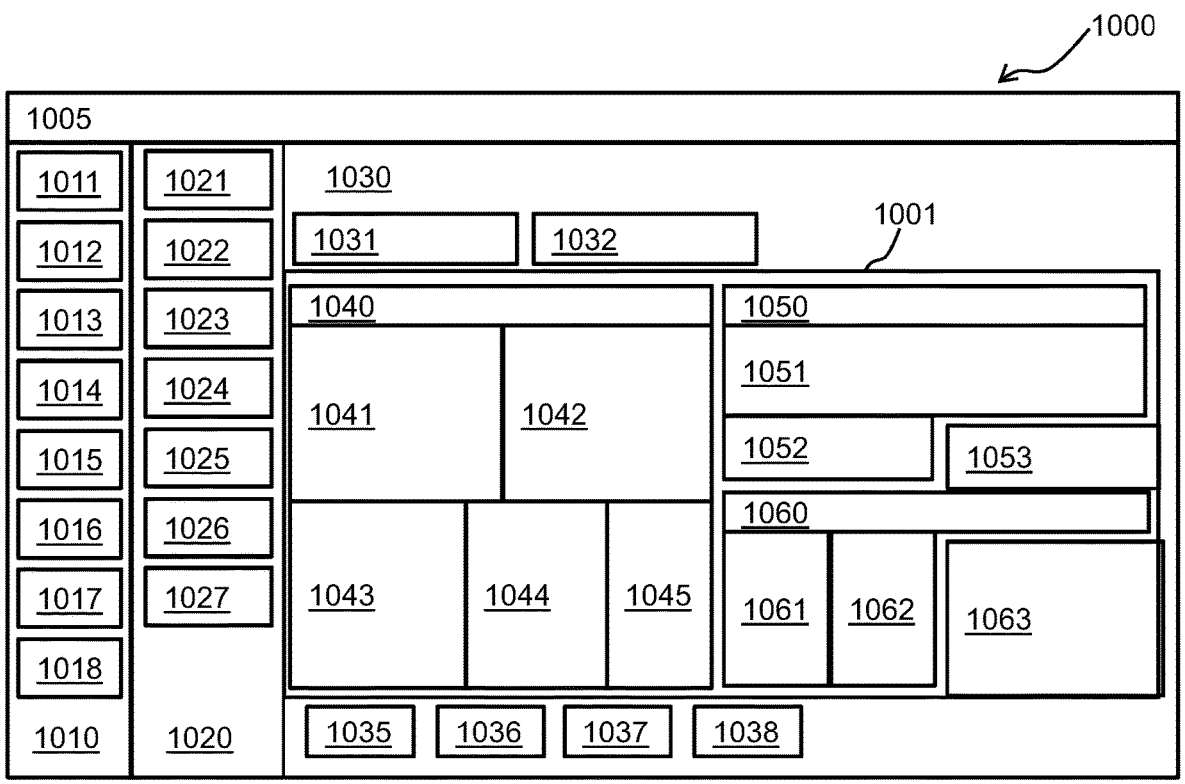
FIG. 10 depicts an interface according to one or more embodiments.

FIG. 10 depicts an interface 1000 according to one or more embodiments. The interface 1000 is an example of the user interface generated by the determination engine in sub-block 995. The interface 1000 can provide a visualization of transformed data (which may originally have been SAP usage data) via a heatmap 1001 with test relevancy. The interface 1000 includes a toolbar 1005 that can present one or more selectable elements, such as a task manager, a testing menu, a profile icon, a search icon, etc. The interface 1000 includes a first panel 1010 that can present one or more selectable elements, such as a home icon 1011, an orchestrator icon 1012, a studio icon 1013, an actions icon 1014, and automation hub icon 1015, a processes icon 1016, a test manager icon 1017, and an admin icon 1018. The interface 1000 includes a second panel 1020 that can present one or more selectable options based on which of the selectable elements of the first panel 1010 are chosen. For example, if the test manage icon 1017 of the first panel 1010 is selected, then the second panel 1020 can present a dashboard option 1021, a heatmap option 1022, a requirements option 1023, a test cases option 1024, a test sets option 1025, a test results option 1026, and a project setting options 1027.

Figure 11:
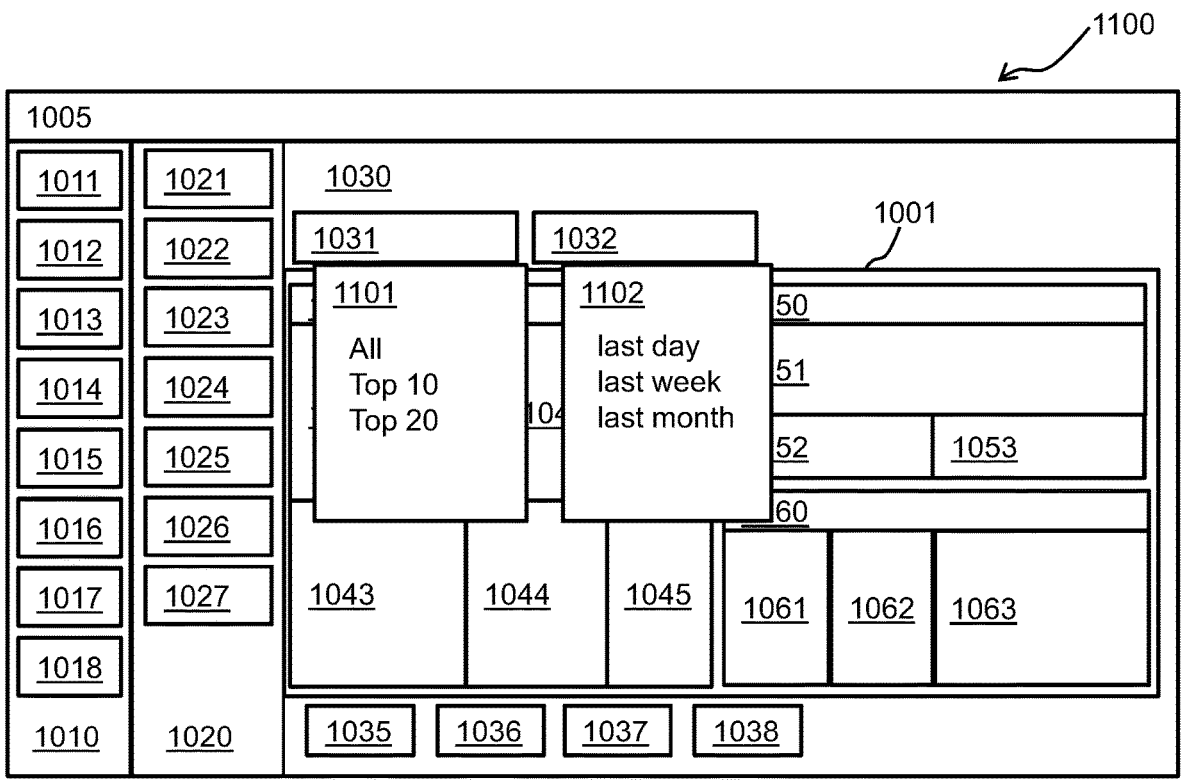
FIG. 11 depicts an interface according to one or more embodiments.

The interface 1000 includes a third panel 1030 that can present one or more menu items 1031 and 1032 and one or more selectable filters 1035, 1036, 1037, and 1038 that are presented alongside the heatmap 1001 and can be utilized to manipulate the heatmap 1001. For example, FIG. 11 depicts an interface 1100 according to one or more embodiments. Elements and identifiers that are similar to other figures are reused and not reintroduced for brevity.

The interface 1100 offers filtering features that provide additional possibilities to focus on most relevant transactions and select the relevant dates. In this regard, the one or more menu items 1031 and 1032 that are presented alongside the heatmap 1001 can be utilized to manipulate the heatmap 1001. The menu item 1031 can be a drop down menu 1101 that provides selectable menu options, such as all transactions, top ten (10) transactions, and top twenty (20) transactions. The menu item 1032 can be a drop down menu 1102 that provides time intervals, such as last day, last week, last month. Other examples include, but are not limited to, last quarter, last year, past six (6) months, etc.

Returning to FIG. 10, the one or more selectable filters 1035, 1036, 1037, and 1038 that are presented alongside the heatmap 1001 can be utilized to manipulate the heatmap 1001. For example, the selectable filter 1035 can be a toggle check box to show all, the selectable filter 1036 can be a toggle check box to show passed, the selectable filter 1037 can be a toggle check box to show failed, and the selectable filter 1038 can be a toggle check box to show no test case assigned.

The heatmap 1001 can include a first process 1040 with one or more elements or shapes 1041, 1042, 1043, 1044, and 1045 (e.g., squares) representing transactions and/or tests thereof. The heatmap 1001 can include a second process 1050 with one or more elements or shapes 1051, 1052, and 1053 (e.g., squares) representing transactions and/or tests thereof. The heatmap 1001 can include a third process 1060 with one or more elements or shapes 1061, 1062, and 1063 (e.g., squares) representing transactions and/or tests thereof. Accordingly, from the transformed data and test results, each element or shape of any process 1040, 1050, and 1060 (e.g., representing a transaction/process of SAP system instances) includes one or more credentials, such as a size (e.g., final rating) and a color.

The final rating or size can be derived by an average or a weighted average of the one or more categories for weights (e.g., SAP-attributes; or users, dialogs/executions, time/execution time, objects/development objects, and intensity/transaction type). According to one or more embodiments, the final rating can give guidance as to 'where to start an automation'.

A size of a shape can indicate a test relevance. Test relevance can refer to a degree to which a test is relevant or important for achieving a specific goal. The test relevance or size is calculated and weighted by the determination engine based on the one or more categories for weights.

A color of a shape can indicate a test coverage. Test coverage can be a visualization showing an execution coverage of a transaction executed by test cases. That is, the identified test cases are executed to determine the test coverage of a transaction. One or more colors can be utilized. According to one or more embodiments, three colors are utilized by the determination engine within the heatmap 1001. A first color (e.g., gray) indicates that test cases do not exist or were not executed. A second color (e.g., red) indicates that test cases exist and at least 1 execution failed. A third color (e.g., green) indicates that test cases exist and all executions passed.

By way of example, the first process 1040 of the heatmap 1001 of FIG. 10 can be divided as follows: the element 1041 can provide a general table display at a 25% size, the element 1042 can provide examples of user interface design at a 25% size, the element 1043 can provide development workbench demos at a 12% size, the element 1044 can provides a rest program block at a 11% size, and the element 1045 can provide an editor at an 8% size to total a 75% area of the heatmap 1001. Further, while no shading is shown in FIG. 10, the elements 1041, 1042, and 1044 can be a second color, the element 1043 can be a first color, and the element 1045 can be a third color.

The second process 1050 of the heatmap 1001 of FIG. 10 can be divided as follows: the element 1051 can provide a change purchase order at a 6% size, the element 1052 can provide a cash journal at a 3% size, and the element 1053 can provide an account line at an 3% size to total a 12% area of the heatmap 1001. Further, while no shading is shown in FIG. 10, the elements 1052 and 1053 can be a second color, and the element 1051 can be a third color.

The process 1060 of the heatmap 1001 of FIG. 10 can be divided as follows: the element 1061 can provide invoices at a 2% size, the element 1062 can provide a financial report at a 2% size, and the element 1063 can provide a general table display at an 14% size to total a 18% area of the heatmap 1001. Further, while no shading is shown in FIG. 10, the element 1062 can be a first color, the element 1061 can be a second color, and the element 1063 can be a third color.

Figure 12:
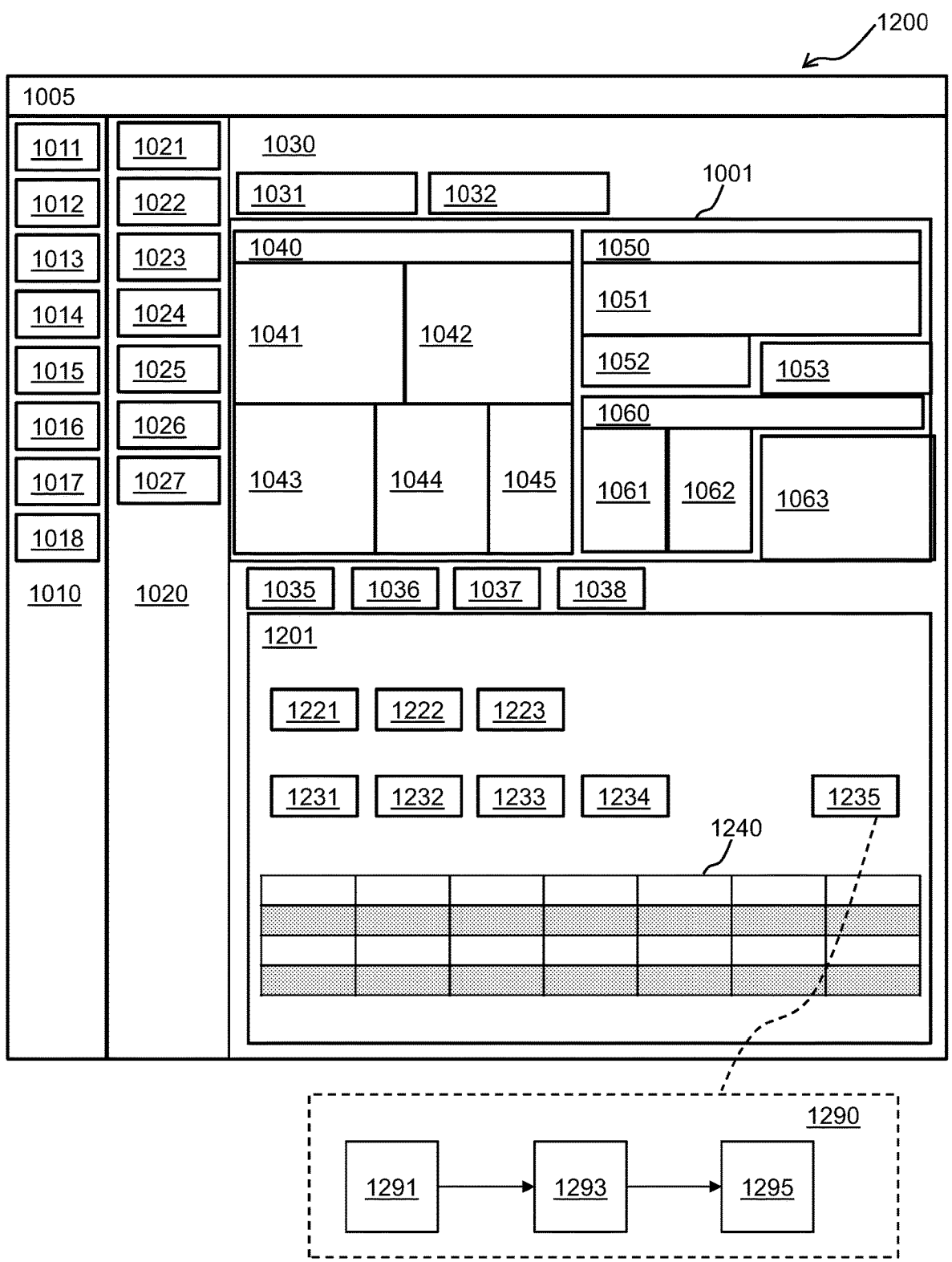
FIG. 12 depicts an interface according to one or more embodiments.
Figure 13:
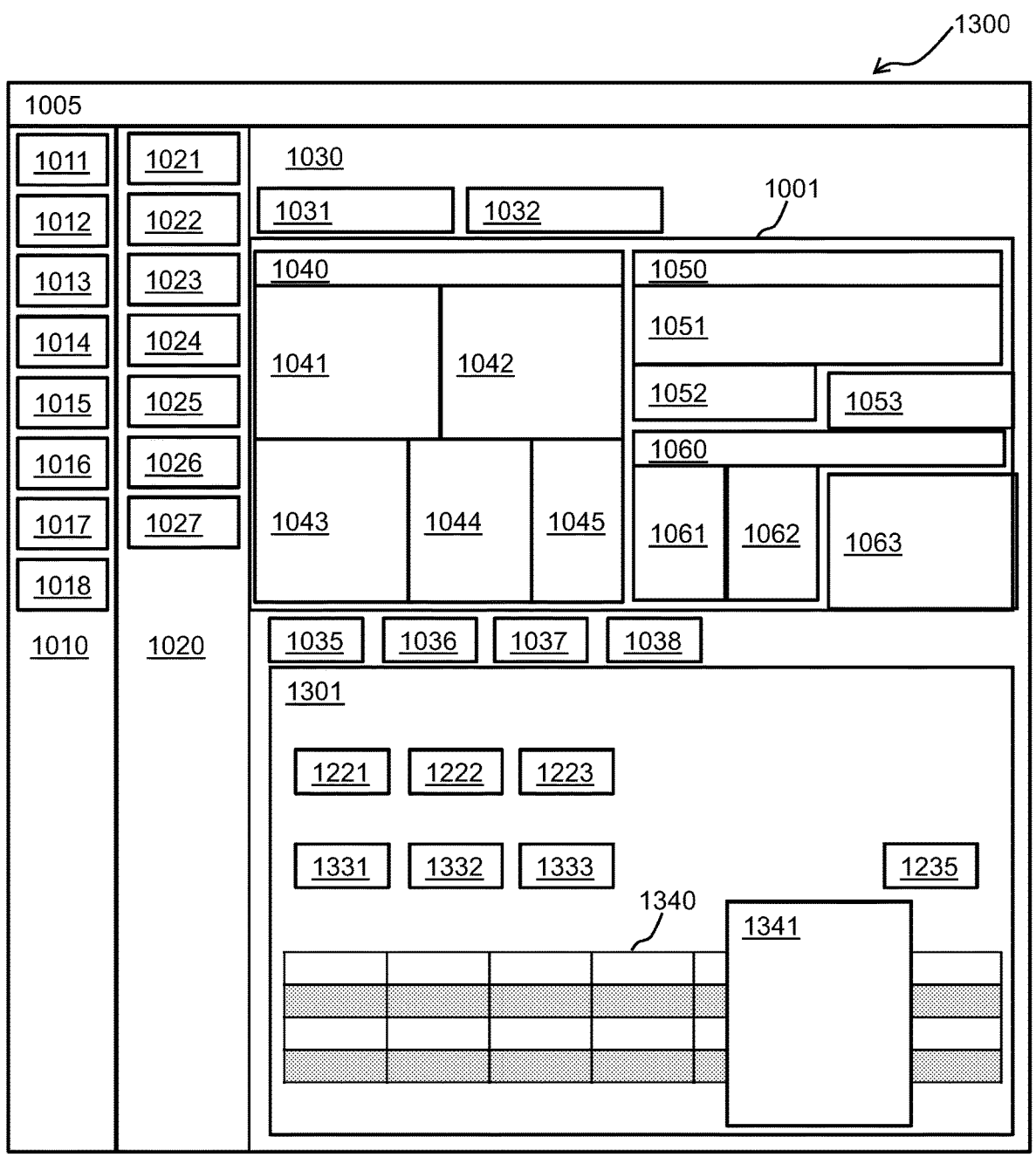
FIG. 13 depicts an interface according to one or more embodiments.

Turning now to FIGS. 12-13, interfaces 1200, 1300, and 1400 are depicted according to one or more embodiments. The interfaces 1200, 1300, and 1400 are examples of the user interface generated by the determination engine in sub-block 995. Elements and identifiers that are similar to other figures are reused and not reintroduced for brevity. For example, the interface 1200 can include a sub-interface 1201 having one or more interface elements 1221, 1222, and 1223 to provide selectable views.

When a transaction is selected and/or when the interface element 1221 is selected, the interface 1200 of FIG. 12 depicts a test case view in the sub-interface 1201 of that selected transaction. That is, upon selection of any element or shape of any process 1040, 1050, and 1060 (e.g., representing a transaction/process of SAP system instances) from the heatmap 1001, the test case view can be provided by the interface 1200. Further, the test case view can include one or more interface elements 1231, 1232, 1233, and 1234 to provide additional options, such as a search option, a label selections, a latest result selections, and a studio project selection. Within the test case view, a user can create 1235 a new test case or review an execution state. Within the test case view, a table 1240 is provided. The table 1240 can provide all assigned test cases to that selected transaction/process. The table 1240 can include sortable columns, such as key, name, studio project, last modified, last result, and labels. According to one or more embodiments, the test case creation by way of selection of the create element 1235 is described with respect to a sub-process 1290. The sub-process 1290 can be performed by the determination engine and include blocks 1291, 1293, and 1295. At block 1291, any process 1040, 1050, and 1060 or element therein can be selected. For instance, an element that includes a first color (e.g., gray) that indicates that test cases do not exist can be selected. Next, at block 1293, the create element 1235 can be selected to enable the test case creation with respect to that process 1040, 1050, and 1060 or element therein. In this regard, a prompt can appear with one or more field for accepting as least an input, such as a name of the test case. At block 1295, the created test case is loaded into the heatmap 1001 with respect to the process 1040, 1050, and 1060 or element therein. According to one or more embodiments, if any process 1040, 1050, and 1060 or element therein has a test case, then using the sub-process 1290 the determination engine create an additional test cases. According to one or more embodiments, if a test case is part of test set (as shown in FIG. 13), the determination engine can execute that test case independently or with the test set through the interface 1200.

When a transaction is selected and/or when the interface element 1222 is selected, the interface 1300 of FIG. 13 depicts a test set view in the sub-interface 1201 of that selected transaction. That is, upon selection of any element or shape of any process 1040, 1050, and 1060 (e.g., representing a transaction/process of SAP system instances) from the heatmap 1001, the test set view can be provided by the interface 1300 Further, the test case view can include one or more interface elements 1331, 1332, and 1333 to provide additional options, such as a search option, a label selections, and a source selection. Within the test case view, a table 1340 is provided. The table 1340 can provide all assigned test sets and can enable immediate execution of one or more of the assigned test sets, either automatically or manually. For example, a pop-up 1341 provides selectable commands for a selected test set, such as execute manually, execute automatically, clone, and delete.

Figure 14:
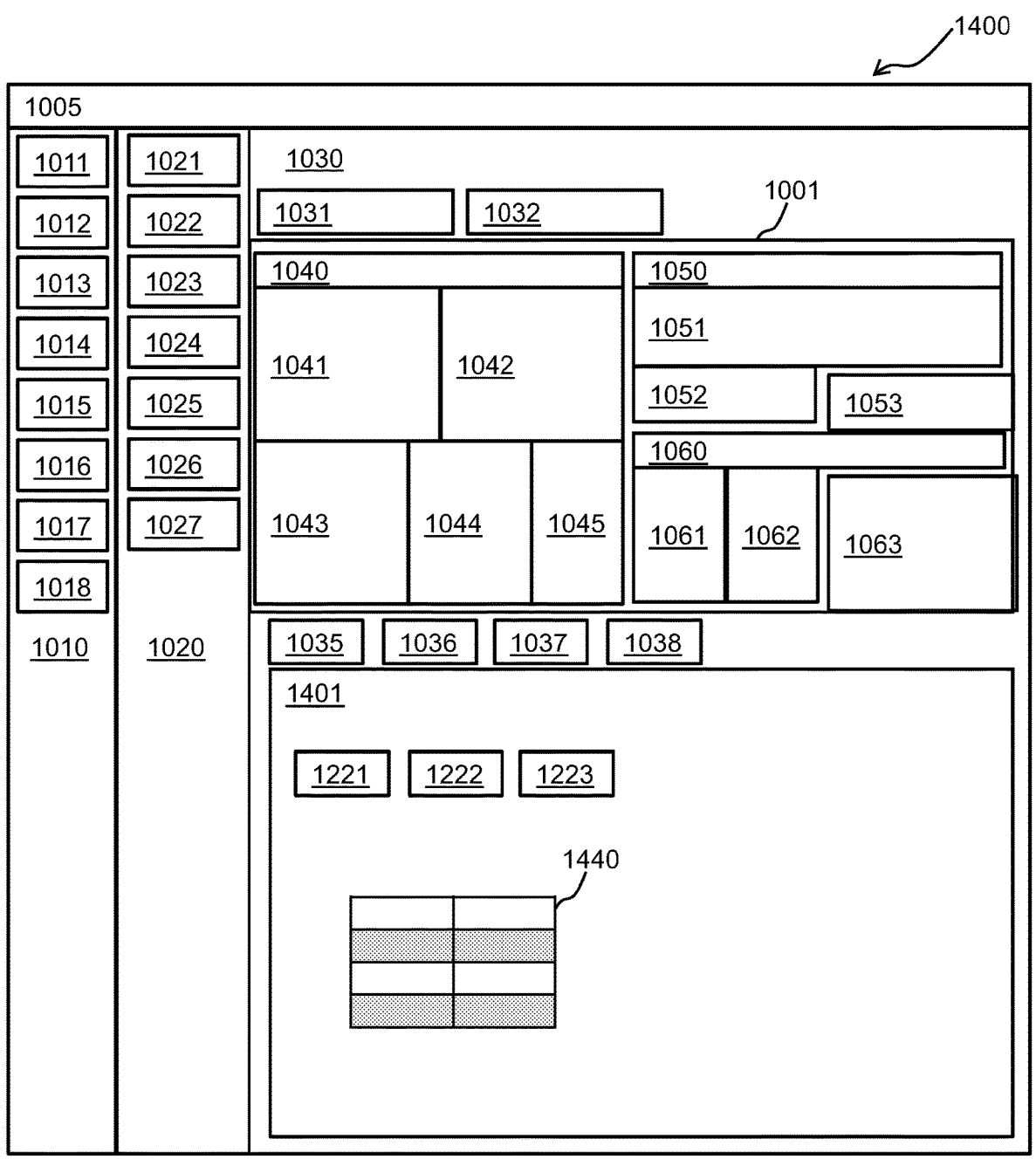
FIG. 14 depicts an interface according to one or more embodiments.

When a transaction is selected and/or when the interface element 1223 is selected, the interface 1400 of FIG. 14 depicts an overview in the sub-interface 1201 of that selected transaction. The interface 1400 of FIG. 14 depicts an overview of transaction. That is, upon selection of any element or shape of any process 1040, 1050, and 1060 (e.g., representing a transaction/process of SAP system instances) from the heatmap 1001, the overview can be provided by the interface 1400. The overview can provide a table 1440. The table 1440 can provide an access to more detailed information of a selected transaction. For example, the table 1440 can include a transaction type, a code, a type, a rating or final rating, and a usage.

Figure 15:
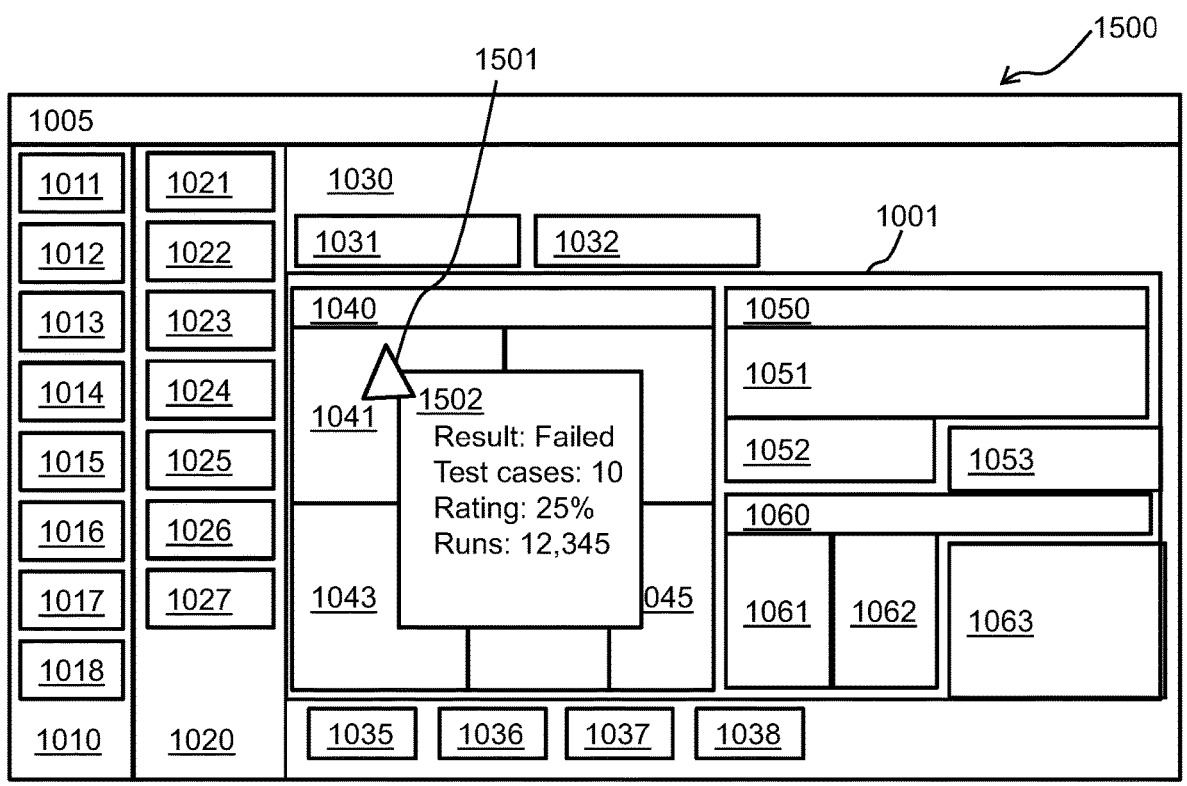
FIG. 15 depicts an interface according to one or more embodiments.
Figure 16:
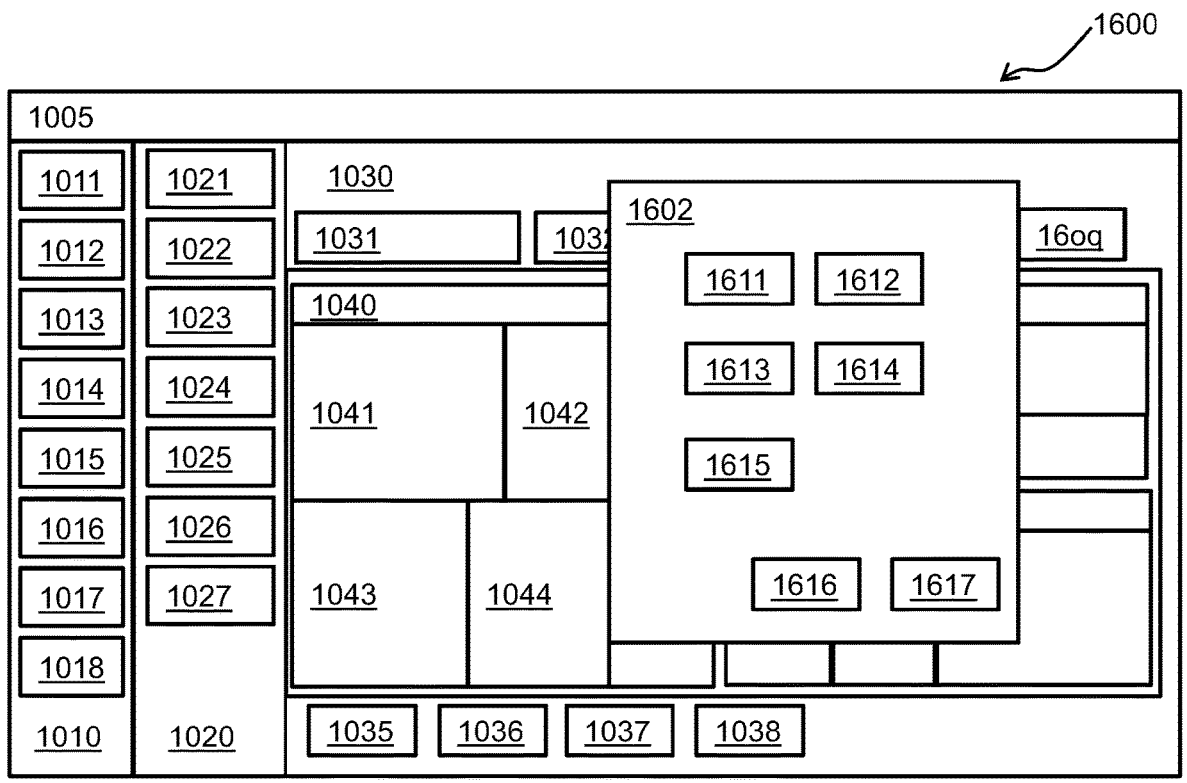
FIG. 16 depicts an interface according to one or more embodiments.

Turning now to FIGS. 15-16, interfaces 1500 and 1600 are depicted according to one or more embodiments. The interfaces 1500 and 1600 are examples of the user interface generated by the determination engine in sub-block 995. Elements and identifiers that are similar to other figures are reused and not reintroduced for brevity. The interface 1500 of FIG. 15 depicts a mouse cursor 1501 that is hovering over element 1041. Upon hovering for a predetermined time, such as instantly, one second, two seconds, etc., a panel 1503 is presented that provides additional information about the elements 1041 (i.e., a test case execution state). The additional information can include a result (of pass or fail), a number of test cases, a rating or final rating, and a number of runs or executions.

The interface 1600 of FIG. 16 depicts additional configurable settings. Upon hovering for a right click of a mouse or a selection of a settings icon 1601, a panel 1602 is presented that provides one or more settings that a user can configure between 0% to 100%. The one or more settings enable the user to decide to change values that determine test relevancy as per customer needs. For example, the one or more categories of weights can be changed as follows: a user weight 1611 can be change to 40%, an execution weight 1612 can be changes to 10%, a time weight 1613 can be changed to 10%, an object weight 1614 can be changed to 10%, and an intensity weight 1615 can be changed to 30%. A cancel interface element 1016 and a save interface element 1617 can then be used, accordingly, once the one or more settings are configured.

According to one or more embodiments, a method for transformation and visualization of consolidated data is provided. The method is executed by a determination engine implemented as a computer program within a computing environment. The method includes executing a data consolidation that normalizes aggregated data into the consolidated data by subjecting the aggregated data to transformations per weights to output the consolidated data. The method includes executing a data transformation and visualization by determining final ratings for the consolidated data and generating on a display a user interface comprising a heatmap depicting the consolidated data according to the final ratings.

According to one or more embodiments or any of the method embodiments herein, the transaction data can include data generated by the software system across one or more servers, one or more users, or more or more transactions.

According to one or more embodiments or any of the method embodiments herein, a collection program of the determination engine can execute at one or more time intervals to aggregate the transaction data.

According to one or more embodiments or any of the method embodiments herein, the weights can include one or more categories of at least a user category, a dialog category, a time category, an object category, and an intensity category.

According to one or more embodiments or any of the method embodiments herein, the dialog category can include a number of executions of a transaction.

According to one or more embodiments or any of the method embodiments herein, the time category can include overall processing time of the software system.

According to one or more embodiments or any of the method embodiments herein, the object category can include a number of development objects.

According to one or more embodiments or any of the method embodiments herein, the object category can include a type of transaction.

According to one or more embodiments or any of the method embodiments herein, the weights can be determined by the determination engine along a range from 0.0000 to 1.0000.

According to one or more embodiments or any of the method embodiments herein, the determination engine can implement the data transformation by analyzing the consolidated data utilizing a mathematical algorithm to generate the final ratings.

According to one or more embodiments or any of the method embodiments herein, the final ratings can include averages or a weighted averages of one or more categories for the weights.

According to one or more embodiments or any of the method embodiments herein, the final ratings can indicate relevance or degrees of strength of the consolidated data.

According to one or more embodiments or any of the method embodiments herein, the heatmap can include one or more elements that include one or more credentials.

According to one or more embodiments or any of the method embodiments herein, the one or more elements can include boxes and the one or more credentials comprise sizes of the boxes or colors of the boxes.

According to one or more embodiments or any of the method embodiments herein, the sizes of the boxes can correspond to the final ratings.

According to one or more embodiments or any of the method embodiments herein, the colors of the boxes can correspond to test coverages.

According to one or more embodiments or any of the method embodiments herein, the determination engine can be added software of the software system or an independent application.

According to one or more embodiments or any of the method embodiments herein, the method implemented by the determination engine can be applied to one or more of SAP ECC, SAP S/4HANA, and SAP EWM.

According to one or more embodiments or any of the method embodiments herein, the executing of the data consolidation can include aggregating transaction data of a software system to produce the aggregated data.

According to one or more embodiments, a computing environment is provided. The computing environment includes at least one processor executing a computer program for a determination engine. The computer program is stored on a memory of the computing environment. The determination engine is configured to implement transformation and visualization of consolidated data by causing the computing environment to execute a data consolidation that normalizes aggregated data into the consolidated data by subjecting the aggregated data to transformations per weights to output the consolidated data. The determination engine is configured to implement transformation and visualization of consolidated data by causing the computing environment to execute a data transformation and visualization by determining final ratings for the consolidated data and generating on a display a user interface comprising a heatmap depicting the consolidated data according to the final ratings.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments, as generally described and illustrated in the figures herein, may be arranged and designed in a wide variety of different configurations. Thus, the detailed description of the embodiments, as represented in the attached figures, is not intended to limit the scope as claimed, but is merely representative of selected embodiments.

The features, structures, or characteristics described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in one or more embodiments. Thus, discussion of the features and advantages, and similar language, throughout this specification may, but do not necessarily, refer to the same embodiment.

Furthermore, the described features, advantages, and characteristics of the one or more embodiments herein may be combined in any suitable manner. One skilled in the relevant art will recognize that this disclosure can be practiced without one or more of the specific features or advantages of a particular embodiment. In other instances, additional features and advantages may be recognized in certain embodiments that may not be present in all embodiments.

One having ordinary skill in the art will readily understand that this disclosure may be practiced with steps in a different order, and/or with hardware elements in configurations which are different than those which are disclosed. Therefore, although this disclosure has been described based upon these preferred embodiments, it would be apparent to those of skill in the art that certain modifications, variations, and alternative constructions would be apparent, while remaining within the spirit and scope of this disclosure. In order to determine the metes and bounds of this disclosure, therefore, reference should be made to the appended claims.

The invention claimed is:

1. A method for transformation and visualization of consolidated data, the method executed by a determination engine implemented as a computer program within a computing environment, the method comprising:
   executing, by the determination engine, a data consolidation that aggregates transaction data of a software system to produce aggregated data and normalizes the aggregated data into the consolidated data by subjecting the aggregated data to transformations per weights and one or more categories of the weights to output the consolidated data,
   wherein the transaction data comprises gigabytes of data; and
   executing, by the determination engine, a data transformation and visualization by determining final ratings for the consolidated data and generating on a display a user interface comprising a heatmap depicting the consolidated data according to the final ratings,
   wherein the final ratings comprise averages or a weighted averages of the one or more categories for the weights.

2. The method of claim 1, wherein the transaction data comprises data generated by the software system across one or more servers, one or more users, or one or more transactions.

3. The method of claim 1, wherein a collection program of the determination engine executes at one or more time intervals to aggregate the transaction data.

4. The method of claim 1, wherein the weights comprise the one or more categories that comprise at least one of a user category, a dialog category, a time category, an object category, and an intensity category.

5. The method of claim 4, wherein the dialog category comprises a number of executions of a transaction.

6. The method of claim 4, wherein the time category comprises overall processing time of a software system.

7. The method of claim 4, wherein the object category comprises a number of development objects.

8. The method of claim 4, wherein the object category comprises a type of transaction.

9. The method of claim 4, wherein the weights are determined by the determination engine along a range from 0.0000 to 1.0000.

10. The method of claim 1, wherein the determination engine implements the data transformation by analyzing the consolidated data utilizing a mathematical algorithm to generate the final ratings.

11. The method of claim 1, wherein the final ratings indicate relevance or degrees of strength of the consolidated data.

12. The method of claim 1, wherein the heatmap comprises one or more elements.

13. The method of claim 12, wherein the one or more elements comprise boxes and one or more credentials comprise sizes of the boxes or colors of the boxes.

14. The method of claim 13, wherein the sizes of the boxes correspond to the final ratings.

15. The method of claim 13, wherein the colors of the boxes correspond to test coverages.

16. The method of claim 1, wherein the determination engine is added software of a software system or an independent application.

17. The method of claim 1, wherein the method implemented by the determination engine is applied to one or more of SAP ECC, SAP S/4HANA, and SAP EWM.

18. The method of claim 1, wherein the transaction data is data generated by an ST03 system across all servers, users, and transactions and data generated by SAP transactions, SAP Fiori Applications, SAP Webdynpro, SAP WinGUI, and SAP WebGUI.

19. The method of claim 1, wherein the transaction data comprises 10 GB of technical data or more.

20. A computing environment comprising at least one processor executing a computer program for a determination engine, a memory of the computing environment comprises the computer program, the determination engine configured to implement transformation and visualization of consolidated data by causing the computing environment to:
   execute a data consolidation that aggregates transaction data of a software system to produce aggregated data and normalizes the aggregated data into the consolidated data by subjecting the aggregated data to transformations per weights and one or more categories of the weights to output the consolidated data,
   wherein the transaction data comprises gigabytes of data; and
   execute a data transformation and visualization by determining final ratings for the consolidated data and generating on a display a user interface comprising a heatmap depicting the consolidated data according to the final ratings,
   wherein the final ratings comprise averages or a weighted averages of the one or more categories for the weights.

* * * * *